United States Patent
Husted et al.

(10) Patent No.: US 8,255,183 B1
(45) Date of Patent: Aug. 28, 2012

(54) COMMUNICATION UNIT WITH ANALOG TEST UNIT

(75) Inventors: Paul J. Husted, San Jose, CA (US); Soner Ozgur, Santa Clara, CA (US)

(73) Assignee: QUALCOMM Atheros, Inc, San Jose, CA (US)

( * ) Notice: Subject to any disclaimer, the term of this patent is extended or adjusted under 35 U.S.C. 154(b) by 535 days.

(21) Appl. No.: 12/494,441

(22) Filed: Jun. 30, 2009

(51) Int. Cl.
*G01R 31/14* (2006.01)

(52) U.S. Cl. ........................................... 702/117

(58) Field of Classification Search .......... 702/57, 702/58, 65, 81, 85, 90, 106, 117, 118, 120, 702/122, 183, 185, 188, 189, 197; 375/221, 375/376; 455/67.11, 67.14, 77
See application file for complete search history.

(56) References Cited

U.S. PATENT DOCUMENTS

| | | | |
|---|---|---|---|
| 6,505,317 B1 * | 1/2003 | Smith et al. | 714/738 |
| 6,892,337 B1 | 5/2005 | Brophy et al. | |
| 7,756,197 B1 * | 7/2010 | Ferguson et al. | 375/224 |
| 7,856,048 B1 * | 12/2010 | Smaini et al. | 375/221 |
| 2005/0095993 A1 * | 5/2005 | Kim et al. | 455/78 |
| 2006/0038579 A1 | 2/2006 | Guthrie et al. | |
| 2006/0176851 A1 | 8/2006 | Bennett et al. | |
| 2007/0162801 A1 | 7/2007 | Moore | |

* cited by examiner

*Primary Examiner* — Mohamed Charoui
(74) *Attorney, Agent, or Firm* — Bay Area Technology Law Group PC

(57) ABSTRACT

Various devices and techniques for testing an analog portion of communication devices are disclosed. Such devices may include a communication unit and an analog test unit. The analog test unit may be configured to test analog portions of the communication unit and communicate information regarding testing to an external test unit. The analog test unit may also be configured to perform an analysis of a test signal that is output by a transmitter portion, looped back to a receiver portion, and subsequently received by the analog test unit. The analog test unit may also be configured to calibrate a DC offset of a receiver chain of the communication unit. The analog test unit may also be configured to perform a nonlinearity test on one or more ADCs and/or DACs of the communication unit.

9 Claims, 8 Drawing Sheets

COMMUNICATION UNIT WITH ANALOG TEST UNIT

BACKGROUND

1. Technical Field

This disclosure relates generally to automated test equipment, and more specifically, to testing an analog portion of a communication unit.

2. Description of the Related Art

Automated test equipment (ATE) provides a quick and cost-efficient way for a computer system to test various aspects of electronic components. As a result, automated test equipment is frequently used in the semiconductor industry to test the integrity of integrated circuits after they are fabricated. In many cases such test equipment is generally expensive and is optimized for the testing of digital rather than analog circuits.

SUMMARY

Various embodiments of a device and methods for testing a device using an external test unit are disclosed. In one embodiment, a device may include a communication unit and an analog test unit. The communication unit may be configured to perform communication via an analog external interface of the device. The analog test unit may be configured to test the analog portion of the communication unit and further configured to communicate information regarding testing of the analog portion to the external test unit. The analog test unit may include logic for performing various tests that generate test signals and/or analyze various aspects of the communication unit. In some embodiments, an analog test unit's ability to perform tests within the device (as opposed to externally—e.g., using the external test unit) may significantly reduce overall testing time, especially for multi-site testing where multiple receiver and transmitter chains on several chips can be tested in parallel.

In one embodiment, a device is configured to perform a "loop back" test. The device in this embodiment includes an analog external interface, a digital external interface, a communication unit, and an analog test unit. The communication unit is configured to perform communication via the analog external interface, where the communication unit has a transmitter portion and a receiver portion. The analog test unit is configured to test the transmitter and receiver portions of the communication unit by generating a test signal that is output by the transmitter portion and looped back (e.g., on a load board of a testing device) to the receiver portion. The analog test unit is configured to subsequently receive the looped back test signal from the receiver portion. The analog test unit is further configured to perform an analysis of the received looped back test signal and to communicate information regarding the analysis to the external test unit.

In another embodiment, a DC offset calibration is performed by a device that includes a communication unit and an analog test unit. The communication unit is configured to perform communication via an analog external interface, and includes a receiver chain. A DC offset calibration unit of the analog test unit is configured to calibrate a DC offset of the receiver chain by measuring the residual DC offset of the receiver chain and providing an offset value to the receiver chain that causes the receiver portion to reduce the DC offset.

In some embodiments, a device may perform a nonlinearity test of an analog to digital converter (ADC). Such a device may be configured to perform communication, and may include an analog test unit configured to test one or more analog portions of the device. The analog test unit may be configured, in one embodiment, to perform the nonlinearity test on an ADC in an analog portion of the device by receiving a low-frequency signal from the ADC and filtering the low-frequency signal with a high pass filter to produce a set of high frequencies. The analog test unit subsequently measures a strength of the set of high frequencies, and provides information indicative of the measured strength to a test unit external to the device, where the external test unit is configured to determine whether nonlinearity is present in the ADC based on the measured strength. For a received low-frequency signal that has also been processed by a digital to analog converter (DAC) of the communication unit, the external test unit may also be configured to determine whether nonlinearity is present in the DAC based on the measured strength.

Various embodiments for testing multiple devices in parallel are also disclosed. In one embodiment, a testing method includes a test device sending, in parallel, a common set of one or more instructions to each of a plurality of integrated circuits under test, where each of the plurality of integrated circuits includes a communication unit that has an analog portion. Each of the plurality of integrated circuits further includes an analog test unit where the sending of the common instructions to each of the plurality of integrated circuits causes the analog test unit in each of the integrated circuits to test the analog portion of its respective communication unit and store corresponding test results in a memory of the integrated circuit. The method also includes the test device receiving corresponding test results from each of the plurality of integrated circuits in parallel.

BRIEF DESCRIPTION OF THE DRAWINGS

The following detailed description makes reference to the accompanying drawings, described briefly below.

DETAILED DESCRIPTION

Figure 1:
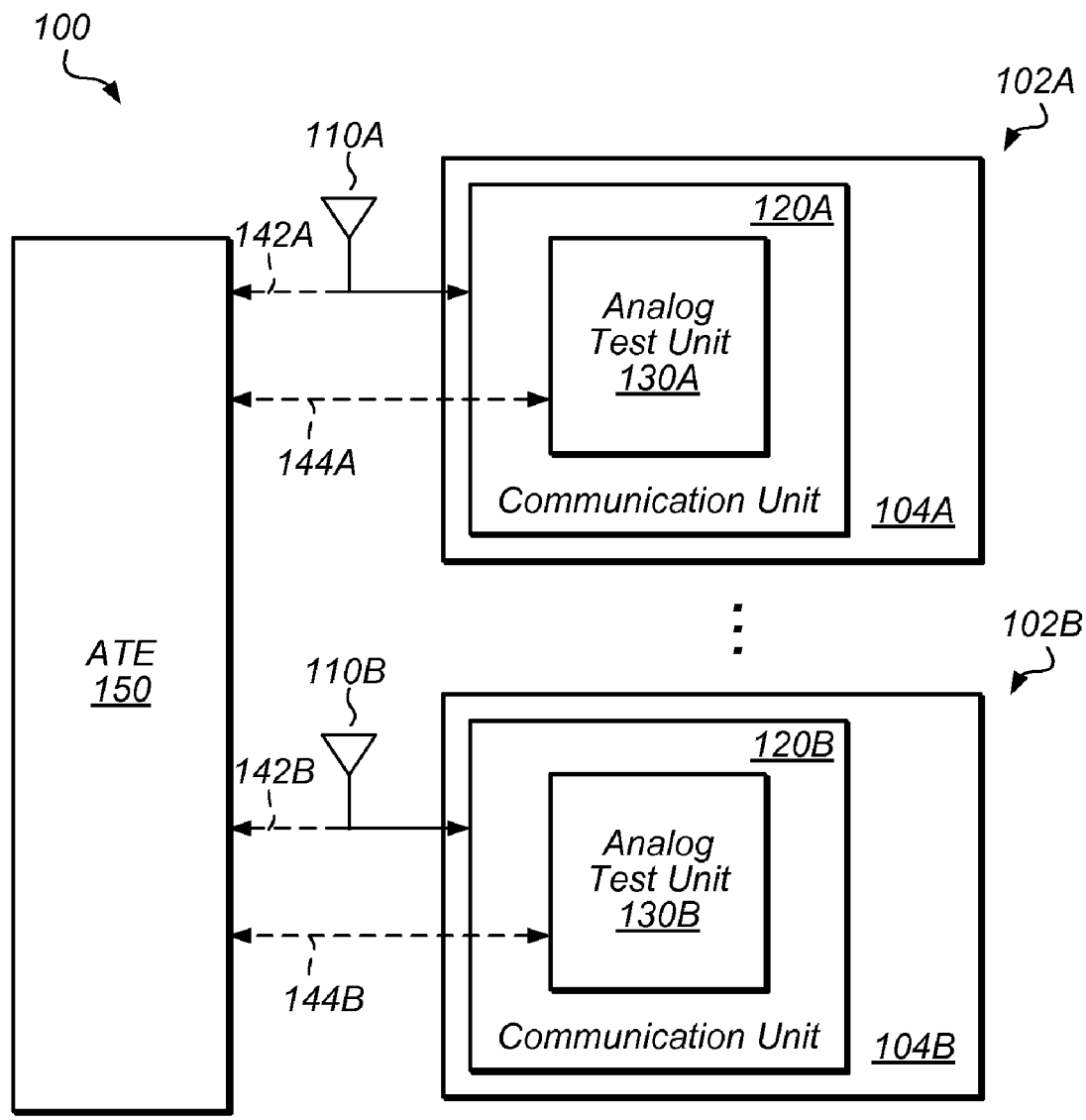
FIG. 1 is a block diagram illustrating one embodiment of a system for testing a plurality of devices.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure, including the appended claims:

"Comprising." This term is open-ended. As used in the appended claims, this term does not foreclose additional structure or steps. Consider a claim that recites: "A device, comprising an analog external interface . . . ." Such a claim does not foreclose the apparatus from including additional components (e.g., a communication unit, an analog test unit, etc.).

"Configured." As used herein, this term means that a particular piece of hardware or software is arranged to perform a particular task or tasks when operated. Thus, a device that is "configured to" perform task A means that the device includes a circuit, program instructions stored in memory, or other structure that, during operation of the device, performs or can be used to perform task A. Similarly, a program that is "configured to" perform task B includes instructions, that if executed by a device, perform task B.

"Automated test equipment (ATE)." This term has its ordinary and accepted meaning in the art, which refers broadly to any automated device that is used to test, for example, circuits or other electronic components.

"Integrated circuit." This term has its ordinary and accepted meaning in the art, and describes one or more circuits located on a common die.

"Parallel." This term has its ordinary and accepted meaning in the art, and refers to performing a plurality of action at substantially the same time.

"Analog portion." This term refers broadly to circuitry within a communication unit that processes an analog signal. An "analog portion" may include any components that have an analog input and output such as, for example, analog mixers, amplifiers, filters, etc. In some embodiments, the analog portion may also include digital-to-analog converters (DAC) and/or analog-to-digital converts (ADC).

"Digital portion." This term refers broadly to circuitry within a communication unit that processes a digital signal. A "digital portion" may include, for example, a modem that modulates or demodulates a digital signal, digital filters, digital mixers, etc.

"Wireless signal." This term has its ordinary and accepted meaning in the art, and may refer to a collection of component signals, such as signals corresponding to I and Q quadrature channels.

"Transmitter portion." This term refers broadly to circuitry within a communication unit that is responsible for processing and transmitting a wireless signal.

"Receiver portion." This term refers broadly to circuitry within a communication unit that is responsible for receiving and processing a wireless signal.

"Loopback." This term refers broadly to providing the output of a transmitter portion as the input of the receiver portion.

"Integral nonlinearity (INL)." This term has its ordinary and accepted meaning in the art and refers to the maximum deviation between the ideal output of a DAC (or ADC) and the actual output level. This term is often used as a metric for measuring error in a DAC or an ADC.

"Differential nonlinearity (DNL)." This term has its ordinary and accepted meaning in the art and refers to the deviation between two adjacent DAC (or ADC) output levels. For example, a DAC with a 1.5 least significant bit (LSB) output change for a 1 LSB digital code change exhibits 12 LSB differential non-linearity. This term is often used as a metric for measuring error in a DAC or an ADC.

Turning now to FIG. 1, one embodiment of a system 100 for testing a plurality of devices is depicted. The present disclosure describes various embodiments of a communication unit and an analog test unit that are included within such a device. In various embodiments, this analog test unit may be used to speed up analog testing in an automated testing environment (particularly when a large number of devices are being tested). Embodiments of the analog test unit described below permit a device such as an ASIC to generate its own test patterns, analyze these patterns, store results of these tests (e.g., in internal registers) for an ATE tester to read. This type of solution may advantageously speed up ATE testing time, especially for multi-site testing and multi-chain WLAN devices. Such solutions may permit, in some embodiments, all chains on all chips in a test environment to be tested in parallel, presenting an improvement relative to prior (serial) analog testing solutions.

As shown, system 100 includes automated test equipment (ATE) 150, which is coupled to devices 102A and 102 B. (It is noted that devices 102A and 102B may be jointly referred to as devices 102 and generically referred to as a device 102, when appropriate. Other elements may be described herein in a similar manner.) Each device 102 includes a housing 104 that contains a communication unit 120 and an analog test unit 130 within unit 120. In the illustrated embodiment, communication unit 120 is coupled to an antenna 110 and to automated test equipment (ATE) 150 via an analog external interface 142. In other embodiments, ATE 150 may be coupled to unit 120 over another analog path such as one used to carry analog signals at baseband. In some embodiments, an analog test bus (ATB) (not shown) may be configured to accept inputs and/or send outputs from multiple devices within communication unit 120. ATE 150 may also be coupled to analog test unit 130 via a digital external interface 144. Antenna 110 may be external (as depicted) or internal to housing 104. In other embodiments, communication unit 120 may include antenna 110. In one embodiment, communication unit 120 and analog test unit 130 may be located on the same integrated circuit, while in another embodiment, communication 130 and analog test unit 130 may be located on different integrated circuits.

ATE 150 may be any automated device that is configured to test electronic devices as known in the art. In one embodiment, ATE 150 is a TERADYNE ULTRAFLEX tester. ATE 150 may be coupled to a plurality of analog test units 150 located in different devices 102 via a digital interface (e.g., digital external interface 144), and configured to test the devices 102 in parallel (as opposed to serially testing devices 102 using an analog interface). For example, in one particular embodiment, ATE 150 is configured in an octal site configuration such that eight devices 102 may be tested simultaneously. (ATEs such as ATE 150 are typically configured to test digital portions of various devices in parallel, but typically have a single RF interface. For such an ATE performing analog testing, parallel testing thus becomes sequential testing, greatly slowing down testing time. As will be described below, the analog test unit will advantageously allow testing to be decreased for analog testing as well.) In various embodiments, ATE 150 includes an interface that supports JTAG or other test protocols.

Devices 102 may be (or be included within) any of various types of devices, including but not limited to: a mobile phone, wireless headset, pager, global positioning system (GPS) unit, digital camera, printer, desktop computer, laptop, personal digital assistant (PDA), or any other suitable device.

Devices 102 may be any type of networked peripheral device such as storage devices, switches modems, routers, etc. In various embodiments, devices 102 may implement any of a variety of communication protocols, including but not limited to: BLUETOOTH, WIFI, or WIMAX.

Communication unit 120 may include one or more receiver portions and/or one or more transmitter portions. In one embodiment, the receiver portion is configured to receive a wireless signal (e.g., from antenna 110 or circuitry coupled thereto) and process it. Similarly, the transmitter portion is configured to process a signal and transmit it wirelessly. In some embodiments, the received and transmitted signals may include digital information signals that have been modulated with a carrier signal and transmitted over a wireless communication channel. Once a transmitted wireless signal is received, the original information signals may be obtained by demodulating the wireless signal. In some embodiments, a wireless signal may be modulated using quadrature modulation in which I and Q quadrature channels correspond to respective digital signals. In an alternative embodiment, a wireless signal may be modulated using polar modulation in which r (amplitude) and Θ (phase) channels correspond to respective digital information signals.

As described in greater detail below, communication unit 120 may include (or be coupled to) an analog test unit 130 that is configured to receive digital commands (e.g., instructions) from ATE 150 via digital external interface 144 and to test the analog portion of communication unit 120. In one embodiment, analog test unit 130 is configured to automatically test the analog portion of communication unit 120. As used herein, the term "automatically" means that once analog test unit 130 receives a set of one or more instructions from ATE 150, analog test unit 130 may perform the test without requiring further instruction—e.g., unit 130 may operate independently of user input. Analog test unit 130 may be further configured to communicate information regarding testing of the analog portion of communication unit 120 to ATE 150 via digital external interface 144. In one embodiment, analog test unit 130 stores the test results of a given test in a set of registers that are accessible by ATE 150. In some embodiments, ATE 150 may be configured to read test results from a plurality of analog test units 120 in parallel (as opposed to reading the results from each device serially).

Analog test unit 130 may include logic for performing various tests that generate test signals and/or analyze various aspects of communication unit 120. Analog test unit 130 may perform tests specific to one or more transmitter portions and/or one or more receiver portions. For example, ATE 150 may send one or more instructions that cause analog test unit 130 to generate a signal to test the transmitter portion of unit 120 and to analyze a signal that has been processed by the receiver portion of unit 120. The results of performed tests may include a simple indication of a pass or fail for a given component, or may include a technical set of parameters describing various aspects of the given component.

In some embodiments, analog test unit 130's ability to perform tests locally (i.e. within communication unit 120 as opposed to externally—e.g., using ATE 150) may significantly reduce overall ATE testing time, especially for multi-site testing where multiple receiver and transmitter chains on several chips can be tested in parallel. For example, in one particular embodiment, analog test unit 130 may cause up to a 12× speed improvement when simultaneously testing four chips each having three transmitter/receiver chains (as opposed to performing serialized testing of individual chains on each chip). In some embodiments, ATE 150 may reduce the amount of communicated data between ATE 150 and an analog test unit by providing the same parameters (or a substantially similar input) to a plurality of analog test units 130 located in different devices 102 (as opposed to a set of specific instructions unique to each unit 130). As a result, in some embodiments, fewer interface pins may be needed for digital external interface 144 relative to prior solutions. In addition, cheaper ATE units 150 with less functionality may be used. Accordingly, embodiments found in the present disclosure may significantly reduce the cost of testing devices 102 (and thus the overall production cost of a device 120).

Figure 2:
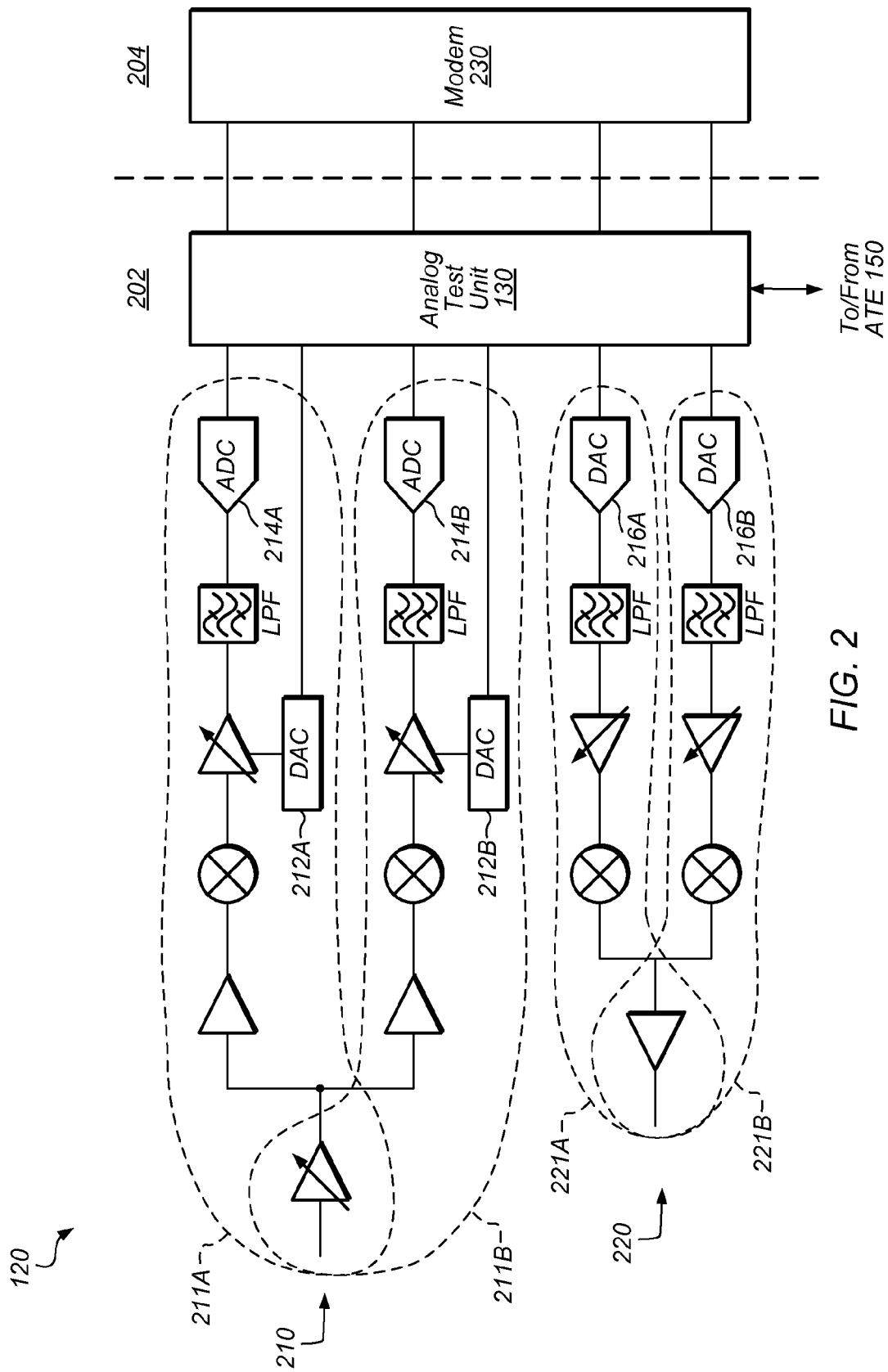
FIG. 2 is a block diagram illustrating one embodiment of a communication unit.

Turning now to FIG. 2, one embodiment of communication unit 120 is shown. Analog portion 202 and digital portion 204 of communication unit 120 are indicated by dotted lines. As shown, analog portion 202 includes receiver chain 210 and transmitter chain 220. Receiver chain 210 has receiver I and Q quadrature paths 211A and 211B. Transmitter chain 220 has transmitter I and Q quadrature paths 221A and 221B. Digital portion 204 includes a modem 230. In the depicted embodiment, analog test unit 130 is coupled between analog to digital converters (ADC) 214A and 214B of receiver paths 211A-B, digital to analog converters (DAC) 216A and 216B of transmitter paths 221A-B, and modem 230. In other embodiments, analog test unit 130 may be located elsewhere and coupled to other various components of receiver chain 210 and transmitter chain 220. In various embodiments, communication unit 120 may have multiple receiver chains 210 and/or transmitter chains 220 (not shown). As such, analog test unit 130 may be configured to test multiple chains 210 and/or 220 in parallel.

Receiver chain 210, in one embodiment, is configured to receive and process a wireless signal (e.g., from analog external interface 142) or a component of a wireless signal. For example, in one embodiment, receiver path 211A may process the I quadrature channel, while receiver path 211B may process the Q quadrature channel. As shown in FIG. 2, receiver chain 210 may include low-noise amplifiers, gain amplifiers, mixers, receiver amplifiers, low pass filters, ADCs, and any other suitable circuitry. As described below, receiver paths 211A and 211B, in some embodiments, may also include offset DACs 212A and 212B, respectively. In the illustrated embodiment, each DAC 212 is coupled to a respective amplifier in a manner that enables the DAC 212 to adjust the DC offset of a given chain 210.

Transmitter chain 220, in one embodiment, is configured to generate and transmit a wireless signal—e.g., by processing and transmitting component signals via analog external interface 142. For example, transmitter path 221A may process the I quadrature channel, while transmitter path 221B processes the Q quadrature channel. Transmitter chain 220 may include DACs, low pass filters, amplifiers, mixers, power amplifiers, and any other suitable circuitry.

Modem 230, in one embodiment, demodulates a digital signal after being processed by receiver chain 210 and modulates a digital signal prior to being processed by transmitter chain 220. Modem 230 may employ, without limitation, any of a variety of modulation schemes such quadrature amplitude modulation (QAM), phase-shift keying (PSK) modulation, Gaussian frequency-shift keying (GFSK) modulation, etc.

Analog test unit 130, in some embodiments, includes logic that is configured to test chain 210 and/or 220 and to communicate information regarding testing of these chains to/from ATE 150. As noted above and described in greater detail below, analog test unit 130 may be configured to receive instructions from ATE 150 and perform any of a variety of tests, including of receiver chains, transmitters chains, or receiver and transmitter chains. In various embodiments, analog test unit 130 may also be configured to test chains 210 and 220 in parallel. Unit 130 may also perform tests in which the output of transmitter chain 220 is connected (e.g., "looped back" as on a load board) as the input of receiver chain 210.

In some embodiments, analog test unit 130 may be disabled during the normal operation of device 102 (e.g., after fabrication and testing of communication unit 120). In one embodiment, when analog test unit 130 is disabled, communication unit 120 is configured to bypass transmitted signals from modem 230 to DACs 216 and received signals from ADCs 214 to modem 230.

Figure 3:
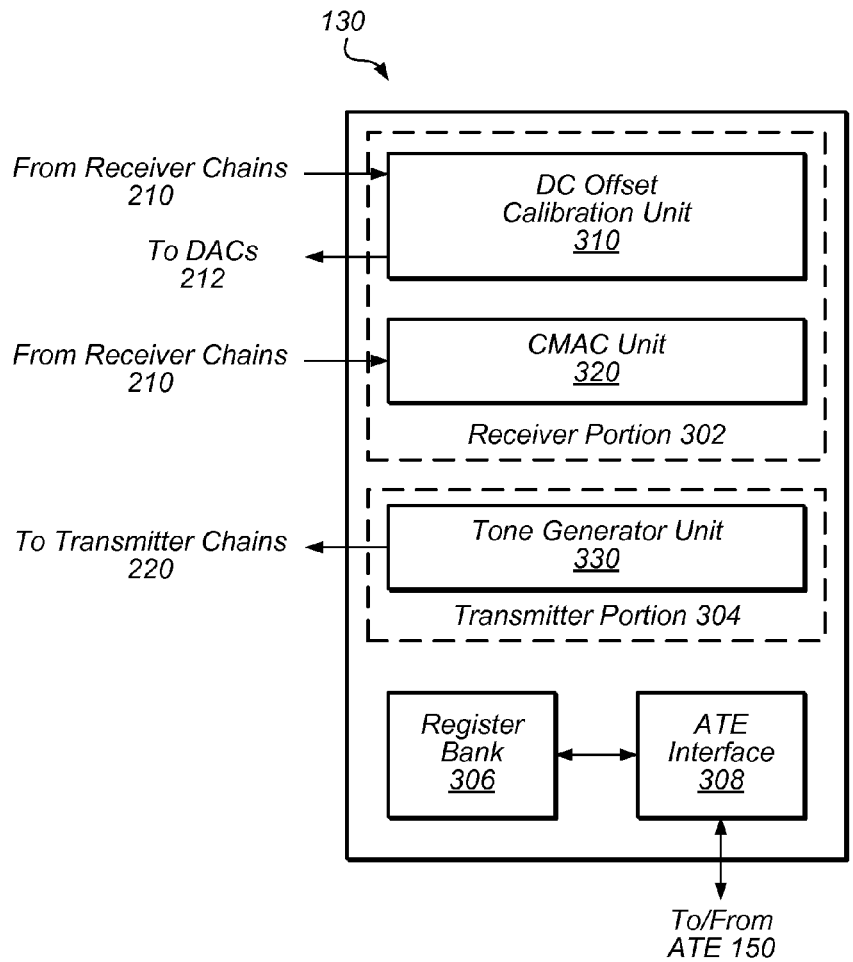
FIG. 3 is a block diagram illustrating one embodiment of an analog test unit within a communication unit.

Turning now to FIG. 3, one embodiment of analog test unit 130 is depicted. As shown, analog test unit 130 includes a receiver portion 302 that includes logic for testing receiver chain 210 and a transmitter portion 304 that includes logic for testing transmitter chain 220. In the illustrated embodiment, receiver portion 302 includes DC offset calibration unit 310 and complex multiply-accumulate (CMAC) unit 320. Transmitter portion 304 includes tone generator unit 330. Analog test unit 130 also includes a register bank 306 and ATE interface 308. In one embodiment, register bank 306 may be a single bank that is coupled to ATE interface 308 (as depicted). In other embodiments, register bank 306 includes a plurality of banks that are interspersed between units 310, 320, and 330.

ATE interface 308, in one embodiment, includes logic that is configured to communicate with ATE 150 via digital external interface 144. ATE interface 308 may receive instructions from ATE 150 to perform tests using units 310, 320, or 330, and may communicate information regarding testing to ATE 150. In some embodiments, ATE interface 308 may support communication using JTAG or other testing protocols. In various embodiments, ATE interface 308 may permit ATE 150 to write to and read from register bank 306.

Register bank 306 may include registers that store various test information used during operation of analog test unit 130. For example, in one embodiment, register bank 306 stores the results of tests executed by unit 130, permitting the results to be accessed by ATE 150. As described in greater detail below, register bank 306 may also include registers associated with various blocks of units 310, 320, or 330. In some embodiments, various registers may support an addressable long shift format. For example, registers in the digital section may be addressable directly via a given bus architecture. The analog registers historically have been written using either a long shift or short shift format. Registers on the long shift chain are addressed via a serial shift interface. Prior solutions included a single serial scan chain that went to all registers. Embodiments of the present disclosure may still have a serial interface, but are addressable. Thus, using separate interfaces for the analog and digital sections, in some embodiments, allows parallel testing to be performed, saving time.

DC offset calibration unit 310, in one embodiment, includes logic that is configured to minimize the DC offset of each receiver path 211 before the I and Q quadrature channels are processed at ADCs 214 in order to prevent the channels from being railed against the high or low boundaries of ADCs 214. For example, if an ADC supports an input range of +/−1 volt and a received analog signal has a DC component of 1.5 volts, the digital version of the signal will become distorted upon conversion, because the 1.5 volt DC component rails against the ADC's 1 volt upper boundary. As described below, unit 310 may be configured to measure the offset of each path 211 in the analog domain and adjust the offsets via DACs 212. (On the other hand, a second unit 510 described below may be configured to further correct the residual offsets of each path 211 in the digital domain.) In some embodiments, unit 310 is configured to automatically calibrate the offsets of paths 211 (i.e., perform the calibration without requiring further instruction from ATE 150). DC offset calibration unit 310 is described in greater detail in conjunction with FIGS. 4 and 10 below.

CMAC unit 320, in one embodiment, includes logic that is configured to analyze the outputs of receiver chain 210 (e.g., at ADCs 214). As described below, CMAC unit 320, in some embodiments, may include a DC offset estimator, one or more power estimators, a cross correlation estimator, and various other circuitry. In various embodiments, CMAC unit 320 is configured to store analysis results in register bank 306 for ATE 150 to read. CMAC unit 320 is described in greater detail in conjunction with FIG. 5 below.

Tone generator unit 330, in one embodiment, includes logic that is programmable by ATE 150 to generate test signals that are provided to transmitter chain 220 for analysis by either ATE 150 or CMAC unit 320. As described below, tone generator unit 330, in some embodiments, may include a DC generator, one or more tone generators, a low-frequency tone generator, a triangle wave generator, a pseudo-noise generator, and any other suitable circuitry. Tone generator unit 330 is described in greater detail in conjunction with FIG. 6 below.

Accordingly, units 310, 320, 330 may be used, in various embodiments, for lab characterization as well as ATE testing. Various tests that may be performed using units 310, 320 and 330 are described in greater detail below in conjunction with FIGS. 7-11.

Figure 4:
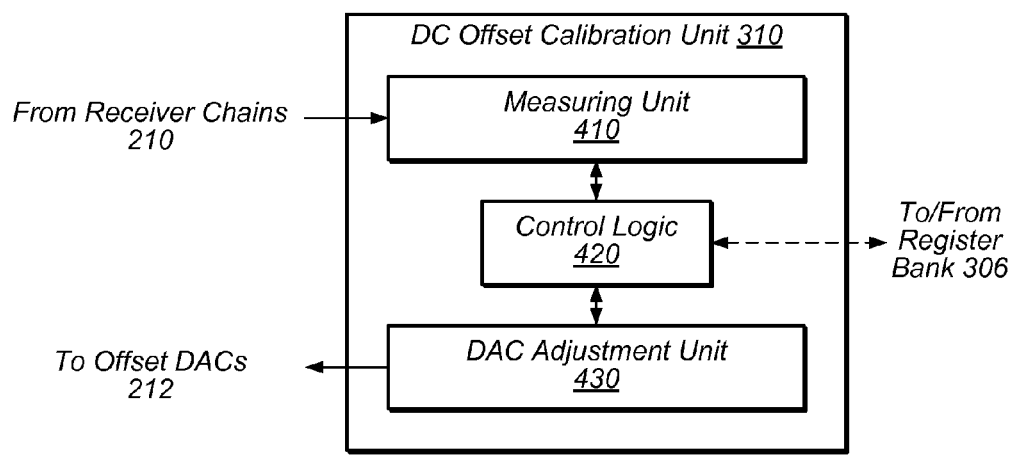
FIG. 4 is a block diagram illustrating one embodiment of a DC offset calibration unit within an analog test unit.

Turning now to FIG. 4, one embodiment of DC offset calibration unit 310 is depicted. In the illustrated embodiment, DC offset calibration unit 310 includes measuring unit 410, control logic 420, and DAC adjustment unit 430. As noted above, unit 310 may minimize the DC offset of each receiver path 211 using the amplifiers of each path 211 by increasing or decreasing the input values of DACs 212.

Measuring unit 410, in one embodiment, includes logic for providing an indication of the current offset of a receiver path 211 to control logic 420. In some embodiments, measuring unit 410 measures the offset at ADCs 214 to determine whether the DC offset is at or very close to the limit of the ADC range, indicating that the ADC is railed. In other embodiments, measuring unit 410 may analyze a received signal and indicate to logic 420 whether the signal has become distorted (e.g., when the waveform of the signal has railed).

Control logic 420, in one embodiment, includes logic for determining offset values that can be applied to DACs 212 in order to compensate for the residual DC offsets of paths 211. As described in conjunction with FIG. 10 below, control logic 420 may determine an appropriate value by applying different potential DC offsets to a path 211 until the offset of the path 211 is minimized. In one embodiment, different potential values are applied in a linear manner until an appropriate offset is determined. In another embodiment, control logic 420 applies different values according to a binary search.

In one embodiment, control logic 420 determines separate offset values depending upon whether a path 211 is using a high or low amplifier gain. For example, in one embodiment, DC offset calibration unit 310 may use a offset value that cancels the DC offset well at a high receiver gain, and another which cancels the offset well at a low receiver gain. In various embodiments, modem 230 may include logic that selects between the offset values based on the determined gain. ATE 150 may also select between the offset values based on the test being performed. In some embodiments, logic 420 may store the values such that they are accessible by ATE 150 (e.g., in register bank 306).

DAC adjustment unit 430 may include logic for setting the offset values of DACs 212. In various embodiments, DAC adjustment unit 420 may control offset DACs 212 using either a short shift value or long shift value.

In various embodiments, DC offset calibration unit 310 may operate in different modes as determined by different values for a register parameter in the register bank 306 such as ate_rxdac_mux shown in the following table:

| ate_rxdac_mux | Description |
|---|---|
| 0 | Long shift values control the receiver offset DAC: This maybe used in the lab for characterization, bringup, testing, etc, allowing any arbitrary offset DAC values to be used. |
| 1 | Short shift values control the receiver offset DAC: These values may be used during normal receiver operation, with modem 230 shifting in a DAC value based on gain setting and earlier calibration |
| 2 | ATE values control the receiver offset DAC during calibration: This is the active control of the DACs by the state machine in analog test unit 130 to perform the offset DAC calculation. |
| 3 | ATE setting during receiver offset DAC calibration: This is the mode where the results of the calibration can be used, without the ATE tester needing to be aware of the value, or needing to write a custom vector to set the DAC. The ATE tester can just write a bit to tell the chip to use low or high gain DAC offset values, and it will. |

DC offset calibration unit 310, in some embodiments, may also be controlled by setting various register parameters such as those shown in the table below. Note that the letters "r" and "w" (shown below and in subsequent tables) designate that a register, in various embodiments, supports reading and/or writing operations.

| Register Parameter | Bits | Description |
|---|---|---|
| ate_rxdac_calibrate | 1 | Set this to initiate receiver DC offset calibration |
| ate_rxdac_done | 1 | Analog test unit 130 will set this bit when calibration is complete |
| ate_rxdac_mux | 2 | Controls receiver offset DACs 212 according to table above |
| ate_rxdac_hi_gain | 1 | For dc calibration with ate_rxdac_mux==2: if set to 1, write results to ate_rx_dac_[i,q]_hi if set to 0, write results to ate_rx_dac_[i,q]_low For other ATE tests with ate_rxdac_mux==3 if set to 1, apply results from ate_rx_dac_[i,q]_hi if set to 0, apply results from ate_rx_dac_[i,q]_low |
| ate_rxdac_cal_wait | 6 | Number of 160 MHz cycles to wait during calibration before reading sign bit of ADCs |
| ate_rx_dac_i_hi | 6rw | Calibrated DC offset for DAC I with high rx gain |
| ate_rx_dac_q_hi | 6rw | Calibrated DC offset for DAC Q with high rx gain |
| ate_rx_dac_i_low | 6rw | Calibrated DC offset for DAC I with low rx gain |
| ate_rx_dac_q_low | 6rw | Calibrated DC offset for DAC Q with low rx gain |
| ate_rx_dac_i_static_low | 6rw | DC offset for DAC I with ate_rxdac_mux == 0 |
| ate_rx_dac_q_static_low | 6rw | DC offset for DAC Q with ate_rxdac_mux == 0 |

Accordingly, DC offset calibration unit 310, in some embodiments, automatically (i.e., without requiring further instruction from ATE 150) measures the residual offset of each receiver path 211 and minimizes the offsets of each path 211 entirely within the confines of communication unit 120 via units 410, 420, and 430. In contrast, prior solutions relied upon the ATE to measure DC offsets, to store the results, and to configure the device. As a result, such devices were calibrated serially. Embodiments of unit 310 may significantly reduce the time required to calibrate the DC offsets of receiver paths 211 relative to these prior solutions because calibration is performed locally at communication unit 120 and may be performed in parallel with other devices 102.

A method describing the operations of unit 310 is presented below conjunction with FIG. 10.

Figure 5:
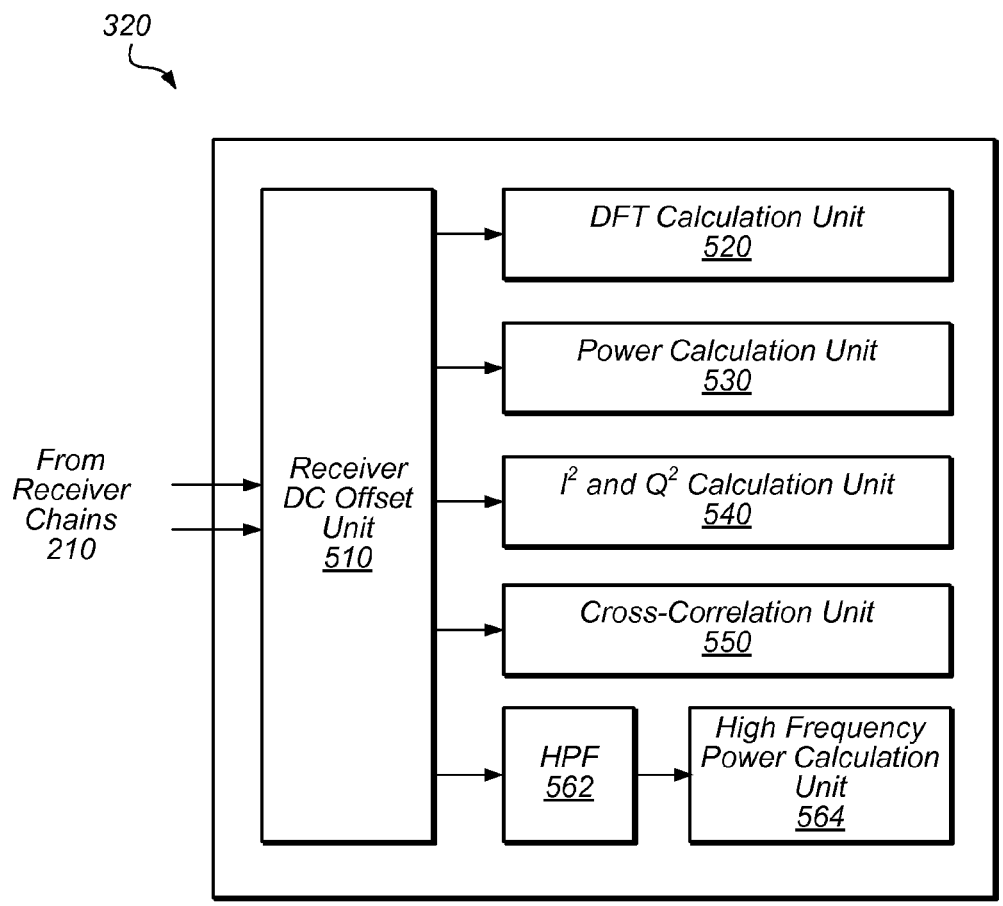
FIG. 5 is a block diagram illustrating one embodiment of a complex multiply-accumulate (CMAC) unit within an analog test unit.

Turning now to FIG. 5, one embodiment of CMAC unit 320 is shown. As illustrated, CMAC unit 320 includes a DC offset unit 510 that is coupled to discrete Fourier transform (DFT) correlation unit 520, power calculation unit 530, $I^2$ and $Q^2$ calculation unit 540, cross-correlation unit 550, and high pass filter 562 (which in turn is coupled to high frequency power calculation unit 564). As noted above, CMAC unit 320 may be programmable to perform tests that measure properties of an incoming signal processed by receiver chain 210 (e.g., at ADCs 214). In one embodiment, the results of tests are stored in 32-bit registers ate_cmac_results_i and ate_cmac_results_q. In some embodiments, ATE 150 may initiate tests via one or more instructions, and read the corresponding values to determine that the tests are complete. In various embodiments, ATE 150 indicates the number of cycles for performing certain tests (e.g., by setting a register in bank 306).

DC offset unit 510, in one embodiment, includes logic that is configured to remove a DC offset of a received signal prior to it being processed by units 520, 530, 540, 562, and 564 (or any other unit within CMAC 320). In some embodiments, certain tests performed using CMAC 320 may require that the DC offset of a received signal be adjusted prior to performing the tests.

In contrast to DC calibration unit 310 described above, DC offset unit 510, in some embodiments, adjusts the DC offset of the received signal in the digital domain (i.e., after being processed by ADCs 214 as opposed to the analog domain as with unit 310). Therefore, unit 510 may not prevent a signal from being railed against the boundaries of ADCs 214, but rather allows further adjustment of DC offsets in the digital domain in additional to the adjustment provided by unit 310 in the analog domain.

In one embodiment, the DC offset is removed as defined by the following registers. Note that the letters "s" and "u" (shown below and in subsequent tables) designate whether a register, in various embodiments, stores a signed or unsigned value.

| Register Parameter | Bits | Description |
|---|---|---|
| ate_cmac_dc_cancel_i | 10s | Add this value to the I ADC prior to ATE measurements |

| Register Parameter | Bits | Description |
| --- | --- | --- |
| ate_cmac_dc_cancel_q | 10s | Add this value to the Q ADC prior to ATE measurements |

In some embodiments, DC offset unit 510 also includes logic that is configured to measure the DC offsets of both I and Q quadrature channels by accumulating the ADC outputs of each receiver path 211. In one embodiment, offset unit 510 may accumulate up to $2^{\wedge}$ ate_cmac_dc_cycles values from a 10-bit ADC. In various embodiments, offset unit 510 stores the measured results locally (e.g., within register bank 306). Thus, analog test unit 130 may be able to measure an offset and apply a correction without ATE 150 needing to remember the offset and write a unique value to each device 102 being tested in order to cancel the respective offset.

The table below illustrates one embodiment of register parameters that are relevant to the operation of DC offset unit 510.

| Register Parameter | Bits | Description |
| --- | --- | --- |
| ate_cmac_dc_enable | 1 | Enable DC-offset unit 510. Analog test unit 130 resets to 0 after measurement is done |
| ate_cmac_dc_cycles | 4u | Measure DC offset for $2^{\wedge}$ ate_cmac_dc_cycles (max $2^{\wedge}15$) |
| ate_cmac_dc_write_to_cancel | 1 | If set, write −ate_cmac_results_[i,q] * $2^{\wedge}$− ate_cmac_dc_cycles (max $2^{\wedge}-15$) to ate_cmac_dc_cancel_[i,q] |
| ate_cmac_results_i | 32s | Signed value for the DC to be applied on the I DAC |
| ate_cmac_results_q | 32s | Signed value for the DC to be applied on the Q DAC |

DFT correlation unit 520, in one embodiment, includes logic that is configured to correlate an incoming waveform of a receiver path 211 with a complex sinusoid (e.g., one running at an integer multiple of 1.25 MHz) and to measure the power of the correlated waveform. Unit 520 may then provide the measured results to ATE 150 (e.g., by storing the results in register bank 306). In one embodiment, the complex sinusoids associated with I and Q quadrature channels are full-scale 11-bit sinusoids that are shifted to be 90 degrees apart from one another. In some embodiments, this configuration yields a 68 dB output signal-to-noise ratio due to reciprocal mixing with quantization noise. In various embodiments, the test(s) performed by unit 520 may run for a programmable number of cycles. Note that the absolute square of the DFT coefficient may represent the power of a signal at a desired frequency. In various embodiments, unit 520 may be used to measure intermodulation products for linearity tests, images due to I/Q mismatch, the relative size of in and out band tones for measuring filter response, etc. Unit 520 may also permit faster measurement of signal size for gain tests using a tone, since the wideband noise gets filtered out in all frequencies except the one being measured.

The table below illustrates one embodiment of register parameters relevant to the operation of DFT correlation unit 520.

| Register Parameter | Bits | Description |
| --- | --- | --- |
| Ate_cmac_corr_enable | 1 | Enable DFT calculation unit 520 Analog test unit 130 resets to 0 after measurement is done. |
| Ate_cmac_corr_cycles | 4 | Measure DC offset for $2^{\wedge}$ ate_cmac_dc_cycles (max $2^{\wedge}15$) |
| Ate_cmac_corr_freq | 6s | Frequency in 1.25 MHz steps (signed) |
| Ate_cmac_results_i | 32s | Signed value for the real part of the correlation output |
| Ate_cmac_results_q | 32s | Signed value for the imaginary part of the correlation output |

Power calculation unit 530, in one embodiment, includes logic that is configured to measure the total power of an incoming waveform by accumulating the $I^2+Q^2$ value. Unit 530 may then provide the measured results to ATE 150 (e.g., by storing the results in register bank 306). In some embodiments, the test(s) performed by unit 530 may run for a programmable number of cycles.

The table below illustrates one embodiment of register parameters that can be used to control the operation of power calculation unit 530.

| Register Parameter | Bits | Description |
| --- | --- | --- |
| ate_cmac_power_enable | 1 | Enable power calculation unit 530 Analog test unit 130 resets to 0 after measurement is done |
| ate_cmac_power_cycles | 4 | Measure DC offset for $2^{\wedge}$ ate_cmac_power_cycles (max $2^{\wedge}13$ for just LSBs) |
| ate_cmac_results_i | 32u | LSBs of Unsigned value for the sum of $I^{\wedge}2 + Q^{\wedge}2$ |
| ate_cmac_results_q | 32u | MSBs of Unsigned value for the sum of $I^{\wedge}2 + Q^{\wedge}2$ |

$I^2$ and $Q^2$ calculation unit 540, in one embodiment, includes logic that is configured to measure the power of an individual quadrature channel (i.e., I or Q) of the incoming waveform by accumulating $I^2$ or $Q^2$ values. Unit 540 may then provide the measured results to ATE 150 (e.g., by storing the results in register bank 306). In some embodiments, the test(s) performed by unit 540 may run for a programmable number of cycles. It is noted that, in various embodiments, units 530 and 540 may be combined into a single unit.

The table below illustrates one embodiment of register parameters that may be used to control the operation of $I^2$ and $Q^2$ calculation unit 540.

| Register Parameter | Bits | Description |
| --- | --- | --- |
| ate_cmac_i2q2_enable | 1 | Enable I2 and Q2 calculation unit 540. Analog test unit 130 resets to 0 after measurement is done |
| ate_cmac_i2q2_cycles | 4 | Measure for $2^{\wedge}$ ate_cmac_i2q2_cycles (max $2^{\wedge}13$) |
| ate_cmac_results_i | 32u | Unsigned value for the sum of $I^{\wedge}2$ |
| ate_cmac_results_q | 32u | Unsigned value for the sum of $Q^{\wedge}2$ |

Cross-correlation unit 550, in one embodiment, includes logic that is configured to measure the cross-correlation of the incoming waveform by accumulating the I*Q value. Unit 550 may then provide the measured results to ATE 150 (e.g., by storing the results in register bank 306). In some embodiments, the test(s) performed by unit 550 may run for a programmable number of cycles. The signals on the I and Q paths are uncorrelated (cross-correlation=0) by design to maximize the amount of information transferred from transmitter to receiver. Any non-zero cross-correlation between the signals on the I and Q paths is an indication of phase imbalance. Therefore, an estimate of the cross-correlation may be used as a metric of amount of I-Q imbalance in the system. In various embodiments, unit 550 measures I/Q phase mismatch, which manifests as I and Q being correlated when they should be uncorrelated. Magnitude mismatch can be found with the above $I^2$ and $Q^2$ measurement.

The table below illustrates one embodiment of register parameters that may be used to control the operation of cross-correlation unit 550.

| Register Parameter | Bits | Description |
| --- | --- | --- |
| ate_cmac_iq_enable | 1 | Enable Rx cross-correlation unit 550. Analog test unit 130 resets to 0 after measurement is done |
| ate_cmac_iq_cycles | 4 | Measure for $2^{\wedge}$ ate_cmac_iq_cycles (max $2^{\wedge}15$) |
| ate_cmac_results_i | 32s | Real part of E{I*Q} |
| ate_cmac_results_q | 32s | 0 |

High frequency power calculation unit 564, in one embodiment, includes logic that is configured to measure the power of an incoming waveform after being processed by HPF 562. As described in conjunction with FIG. 11 below, unit 564, in one embodiment, is used to determine the integral nonlinearity (INL) and/or differential nonlinearity (DNL) of the DACs 216 and ADCs 214. In one particular embodiment, HPF 562 is a third order elliptic filter, with fc=100 kHz, fp=1.3 MHz, Ac=−80 dB, Ap_ripple=0.5 dB.

The table below illustrates one embodiment of register parameters that control the operation of unit 564.

| Register Parameter | Bits | Description |
| --- | --- | --- |
| ate_power_HPF_enable | 1 | Enable high frequency power calculation unit 564. Analog test unit 130 resets to 0 after measurement is done |
| ate_power_HPF_cycles | 4 | Measure for $2^{\wedge}$ ate_power_HPF_cycles |
| ate_power_HPF_wait | 4 | Wait for $2^{\wedge}$ ate_power_HPF_wait before starting measuring |
| ate_cmac_results_i | 32u | Unsigned value for the sum of $I^2$ |
| ate_cmac_results_q | 32u | Unsigned value for the sum of $Q^2$ |

In various embodiments, CMAC unit 320 may provide significant advantages over prior solutions because it performs tests locally via blocks 510, 520, 530, 540, 562, and 564 (as opposed to prior solutions in which an ATE performs such tests remotely using its analog and/or digital testing interfaces). As a result, embodiments of CMAC unit 320 may enable multiple devices to be tested in parallel using the digital interfaces of ATE 150.

Figure 6:
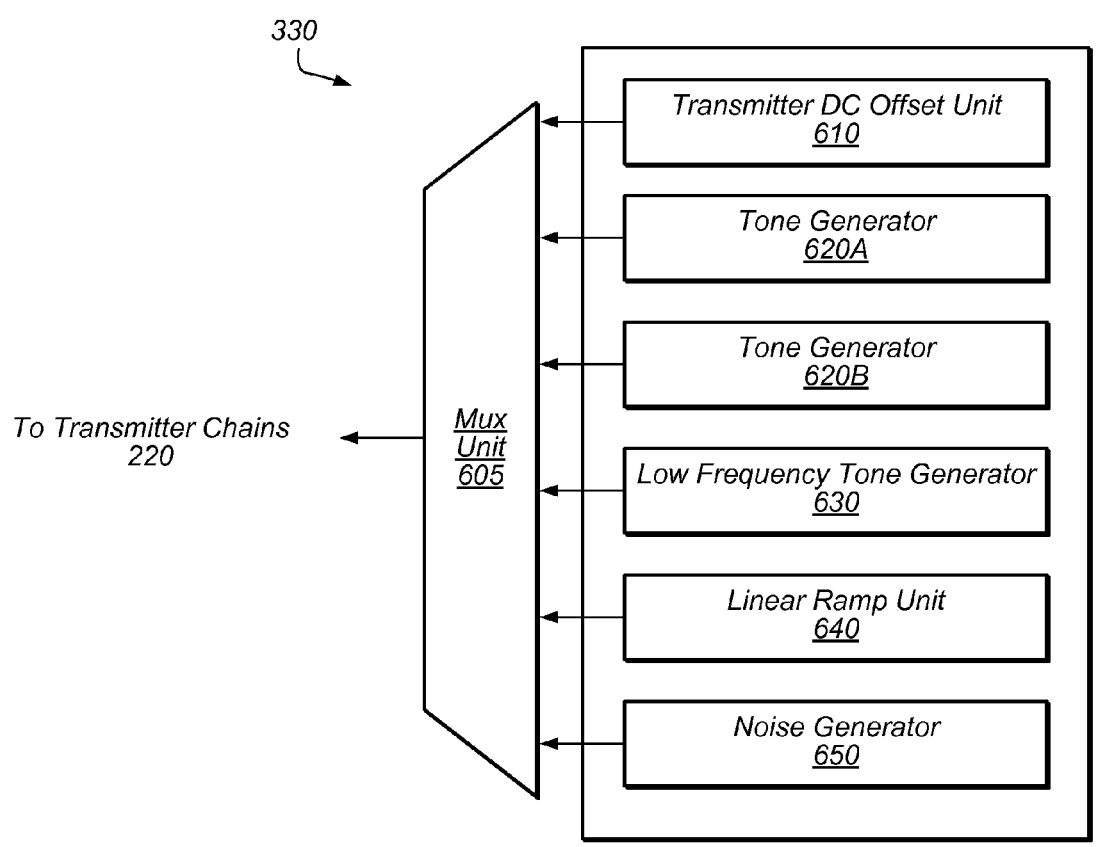
FIG. 6 is a block diagram illustrating one embodiment of a tone generator unit within an analog test unit.

Turning now to FIG. 6, one embodiment of a tone generator unit 330 is illustrated. As noted above, tone generator unit 330 may be programmable to generate signals to test transmitter chain 220. In the embodiment shown in FIG. 6, tone generator unit 330 includes a multiplexer (MUX) unit 605 coupled to a transmitter DC offset unit 610, tone generators 620A and 620B, low-frequency tone generator 630, linear ramp unit 640, and noise generator unit 650.

MUX unit 605, in one embodiment, includes logic that is configured to combine the outputs of two or more units 610, 620, 630, 640 and 650 into a single waveform. For example, tone generator unit 330 may create a sine wave having a specified DC offset by summing the digital outputs of DC offset unit 610 and tone generator 620A. Various other combinations of waveforms are possible.

Transmitter DC offset unit 610, in one embodiment, includes logic that is configured to provide a programmable DC offset value for both transmitter paths 221 (e.g., both I and Q quadrature channels). In some embodiments, these DC offsets values are then added to the outputs of units 620, 630, 640, 650 to create a signal processed by transmitter chain 220. The table below illustrates one embodiment of register parameters that control the operation of transmitter DC offset unit 610.

| Register Parameter | Bits | Description |
| --- | --- | --- |
| ate_tonegen_dc_enable | 1 | Enable transmitter DC offset unit 610 |
| ate_tonegen_dc_i | 11s | Signed value for the DC to be applied on the I DAC |
| Ate_tonegen_dc_q | 11s | Signed value for the DC to be applied on the Q DAC |

Tone generators 620A and 620B, in one embodiment, include logic that is configured to provide complex tones at specified frequencies and amplitudes (as needed for whatever test is being conducted). In one embodiment, each tone generator 620 is configured to generate a complex tone consisting of a cos(wt)+j sin(wt) signal, where the real part of the signal is provided to the I DAC (e.g., DAC 216A) and the imaginary part is provided to the Q DAC (e.g., DAC 216B). In one embodiment, each generator 620 uses a look-up table to generate a 1.25 MHz fundamental tone. In some embodiments, generators 620 may generate higher frequencies by downsampling this fundamental tone by an appropriate rate. In one embodiment, the signal to quantization noise ratio in a generated complex tone is 68 dB.

In one embodiment, tone generators 620A and 620B generate tones at a frequency and amplitude specified by the following corresponding formulas.

Tone generator 620A:

Frequency=ate_tonegen_tone0_freq*1.25 MHz.

Amplitude=full-scale sine wave*$2^{\wedge}$(−ate_tonegen_tone0_exp)* ate_tonegen_tone0_A_man.

Tone generator 620B:

Frequency=ate_tonegen_tone1_freq*1.25 MHz

Amplitude=full-scale sine wave*$2^{\wedge}$(−ate_tonegen_tone1_A_exp)* ate_tonegen_tone1_A_man.

The tables below illustrate one embodiment of register parameters that may be used to control the operation of tone generators 620A and 620B.

| Register Parameter | Bits | Description |
| --- | --- | --- |
| ate_tonegen_tone0_enable | 1 | Enable generator 620A |
| ate_tonegen_tone0_freq | 6s | Frequency in 1.25 MHz steps (signed) |
| ate_tonegen_tone0_A_exp | 3u | Back-off from full-scale in 6 dB increments 7 means 0 dBFS |

| Register Parameter | Bits | Description |
| --- | --- | --- |
| ate_tonegen_tone0_A_man | 8u | Linear scaling coefficient |
| ate_tonegen_tone0_tau_k | 6u | Delay |
| ate_tonegen_tone1_enable | 1 | Enable generator 620B |
| ate_tonegen_tone1_freq | 6s | Frequency in 1.25 MHz steps (signed) |
| ate_tonegen_tone1_A_exp | 3u | Back-off from full-scale in 6 dB increments 7 means 0 dBFS |
| ate_tonegen_tone1_A_man | 8u | Linear scaling coefficient |
| ate_tonegen_tone1_tau_k | 6u | delay |

Low-frequency tone generator 630, in one embodiment, includes logic that is configured to generate a low-frequency complex tone. As described below in conjunction with FIG. 11B, unit 630, in one embodiment, drives a complex tone that is used to determine the integral nonlinearity (INL)/differential nonlinearity (DNL) of the DACs 216 and ADCs 214. In one embodiment, generator 630 uses a look-up table and a cascaded integrator comb (CIC) filter to generate a fundamental tone (e.g., at 160 MHz*2^(−11)~78.1 kHz). In some embodiments, the look-up table used by unit 630 may be the same look-up table used by units 620. The harmonics of this tone may be generated by stepping through the look-up table in steps of 1 or more entries per step, where a step of N corresponds to a frequency of N times the fundamental frequency. In some embodiments, the signal to quantization noise ratio in the complex tone is 68 dB. In various embodiments, the CIC filter is designed so that the interpolation images are lower than the quantization noise in the look-up table. In other embodiments, low-frequency tone generator 630 may generate a low-frequency tone using other techniques (as needed for whatever test is being conducted).

The table below illustrates one embodiment of register parameters that may be used to control the operation of low-frequency tone generator 630.

| Register Parameter | Bits | Description |
| --- | --- | --- |
| ate_tonegen_lftone0_enable | 1 | Enable low freq tone_0 generator |
| ate_tonegen_lftone0_freq | 6s | Frequency in 1.25 MHz steps (signed) |
| ate_tonegen_lftone0_A_exp | 3u | Back-off from full-scale in 6 dB increments 7 means 0 dBFS |
| ate_tonegen_lftone0_A_man | 8u | Linear scaling coefficient |
| ate_tonegen_lftone0_tau_k | 6u | delay |

Linear ramp unit 640, in one embodiment, includes logic that is configured to generate a triangle wave that oscillates between the maximum and minimum DAC input values. In various embodiments, the DACs have a programmable dwell time on each value, and a programmable step between values. The output signal of unit 640 may start at ate_tonegen_linramp_init_i (or q). The signal is held constant for ate_tonegen_linramp_dwell_i number of samples, and is incremented by ate_tonegen_linramp_step_i values. In some embodiments, if only one of the I or Q channels is enabled and the other channel is disabled, the midrange value may be sent as DC value on the unused DAC, or the DC value in ate_tonegen_dc_[i,q] may be used if ate_tonegen_dc_enable==1.

The table below illustrates one embodiment of register parameters that control the operation of linear ramp unit 640.

| Register Parameter | Bits | Description |
| --- | --- | --- |
| ate_tonegen_linramp_enable_i | 1 | Enable linear ramp in DAC I |
| ate_tonegen_linramp_enable_q | 1 | Enable linear ramp in DAC Q |
| ate_tonegen_linramp_dwell_i | 10u | Dwell time on each DAC value in 160 MHz cycles |
| ate_tonegen_linramp_step_i | 6u | Step size of each transition |
| ate_tonegen_linramp_init_i | 11s | Initial value |
| ate_tonegen_linramp_dwell_q | 10u | Dwell time on each DAC value in 160 MHz cycles |
| ate_tonegen_linramp_step_q | 6u | Step size of each transition |
| ate_tonegen_linramp_init_q | 11s | Initial value |

In various embodiments, using a ramp signal as a test signal ensures that a desired subset of codewords is being used consecutively. Applying such an input and measuring the expected differential steps at the ADC or DAC outputs provides a reliable estimate of the DNL. Therefore, such a test-signal may be used in tests that measure the non-linear transfer function of an ADC or a DAC. In some embodiments, unit 640 may spend the same amount of time at each code of the DAC, so that an analyzer could be programmed to record the DAC output or RF output for each DAC setting. The low-frequency sine wave may also be programmed so that it touches each DAC code. In one embodiment, unit 640 may not spend the same amount of time at each code, so it may not be as good for time domain analysis.

Noise generator 650, in one embodiment, includes logic that is configured to generate noise using a pseudo-random binary sequence (PRBS). In some embodiments, noise generator 650 includes two PRBS generators (not shown)—e.g., one for the I channel and one for the Q channel. The PRBS generators may be 31 bits long with different seeds for each. Each may create a signal of +/−1 that is multiplied by a programmable multiplier effect to create white noise. If DC offset unit 610 is enabled, the DC values in ate_tonegen_dc_[i,q] may be added to the PRBS generator output. The table below illustrates one embodiment of register parameters that control the operation of noise generator 650.

| Register Parameter | Bits | Description |
| --- | --- | --- |
| ate_tonegen_prbs_enable_i | 1 | Enable PRBS noise in DAC I |
| ate_tonegen_prbs_enable_q | 1 | Enable PRBS noise in DAC Q |
| ate_tonegen_prbs_magnitude_i | 10u | Magnitude of the PRBS multiplier |
| ate_tonegen_prbs_seed_i | 31u | Seed |
| ate_tonegen_prbs_magnitude_q | 10u | Magnitude of the PRBS multiplier |
| ate_tonegen_prbs_seed_q | 31u | Seed |

Various ones of units 610, 620, 630, 640, and 650 described above, in one embodiment, are programmable to generate outputs that are selectable and combinable by MUX 605 to produce one or more waveforms as needed for whatever test is being conducted. By generating these waveforms locally with analog test unit 130, ATE 150 can send a generic set of instructions via digital external interfaces 144 to a plurality of devices 102 that cause then generate test signals in a parallel. As a result, embodiments of tone generator unit 330 may significantly reduce testing time relative prior solutions in which an ATE would serially test devices using its analog interface to generate various testing signals.

Figure 7:
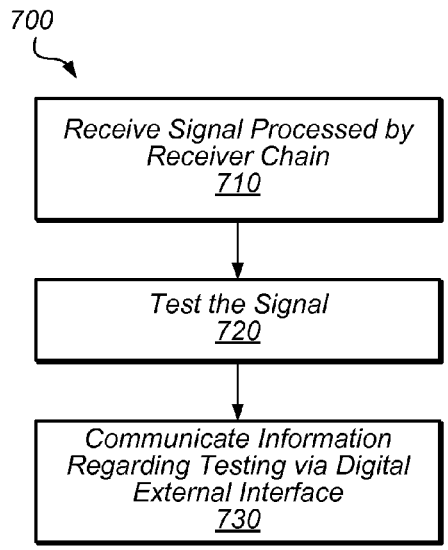
FIG. 7 is a flowchart illustrating an exemplary method for testing the receiver portion of a communication unit.
Figure 8:
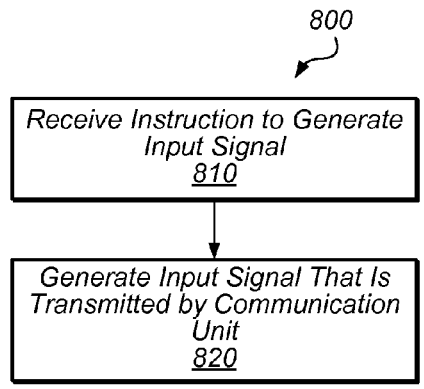
FIG. 8 is a flowchart illustrating an exemplary method for testing the transmitter portion of a communication unit.

Turning now to FIG. 7, an exemplary method 700 for testing the receiver portion of communication unit 120 is depicted. In one embodiment, analog test unit 130 performs method 700 after receiving an instruction from ATE 150 via digital external interface 144. In step 710, analog test unit 710 receives a signal that has been processed by receiver chain 210. In some embodiments, the received signal may be provided to communication unit 120 by ATE 150 via analog external interface 142. In step 720, analog test unit 130 tests the signal using any of the components included in DC offset calibration unit 310 or CMAC unit 320. For example, CMAC 320 may measure the power of the I and Q quadrature channels. Alternately, DC offset calibration unit 310 may analyze the received signal to calibrate the DC offset of a receiver path 211 as described in conjunction with FIG. 10 below. In one embodiment, analog test unit 130 stores the corresponding results in register bank 306. In step 730, analog test unit 130 communicates information regarding testing to ATE 150 via digital external interface 144. In various embodiments, this information may include an indication of a pass or fail for the test being performed, various measured parameters associated with the test, or other relevant data. In some embodiments, method 700 is also performed in parallel across a plurality of devices 102. For example, ATE 150 may send a generic set of one or more instructions to each of a plurality of devices 102 that causes the analog test units 130 in each of the devices 102 to perform these tests simultaneously.

While method 700 has been described as being performed by analog test unit 130, corresponding methods performed by ATE 150 are also contemplated. For example, in a method corresponding to method 700, ATE 150 may first provide the received signal to communication unit 120, provide an instruction that specifies the test to be performed, and then receive information about results of the test from unit 130.

The following list includes various tests that may be performed using method 700. Note that each example includes exemplary program instructions that may be executed by ATE 150. For example, executing the step "set ate_cmac_corr bit", in one embodiment, may cause ATE 150 to set a corresponding value in register bank 306, while, in another embodiment, ATE 150 may send an instruction that causes analog test unit 130 to set the ate_cmac_corr bit.

Single Tone Absolute Power (Lower Channel)
  Test mode/circuit:
    ATE 150 drives a sinusoidal continuous waveform with a frequency of channel +5 Mhz and the down converted signal is measured using the correlator feature of the CMAC unit 320.
  Test Overview:
    The rx single tone (absolute power) test isolates the receive block by driving a CW waveform from the ATE microwave source instrument and capturing the baseband results using the CMAC 320. The correlator will capture the results and determine what the I/Q amplitude mismatch is and also the phase error.
  ATE program:
    1) Setup ATE microwave source to drive channel +5 Mhz frequency.
    2) Setup radio (channel, gain)
    3) Set appropriate ate_cmac_corr_cycles bits
    4) Set appropriate ate_cmac_corr_freq bits
    5) Set ate_cmac_corr_enable bit
    6) Wait for ate_cmac_corr_done bit to be set
    7) Read back ate_cmac_results_i and q results
    8) Determine absolute power of I and Q signals and the amplitude and phase error
    9) Determine pass and fail result Single Tone Measurement
  Description:
    ATE 150 drives a sinusoidal continuous waveform with a frequency of channel +1.25 Mhz and the down converted signal is measured using CMAC unit 320.
  ATE program:
    1) Setup radio (gain, channel, etc.) with JTAG pattern.
    2) Set ate_tonegen_tone1_enable bit
    3) Set appropriate ate_tonegen_tone1_freq bits
    4) Set appropriate ate_tonegen_tone1_backoff bits
    5) Setup radio (channel, gain)
    6) Set ate_cmac_corr_enable bit
    7) Set appropriate ate_cmac_corr_cycles bits
    8) Set appropriate ate_cmac_corr_freq bits
    9) Wait for ate_cmac_corr_done bit to be set
    10) Read back ate_cmac_results_i and q results
    11) Determine absolute power of I and Q signals and the amplitude and phase error
    12) Determine pass and fail result Turning now to FIG. 8, an exemplary method 800 for testing the transmitter portion of communication unit 120 is depicted. Method 800, in one embodiment, is performed by analog testing unit 130. Corresponding methods performed by ATE 150 are also contemplated. In step 810, analog test unit 130 receives an instruction to generate an input signal for one or both transmitter paths 221. In one embodiment, ATE 150 transmits the instruction to analog test unit 130 via digital external interface 144. In another embodiment, ATE 150 sets one or more parameters in register bank 306 that causes analog test unit 130 to perform step 820. In step 820, tone generator unit 330 generates an input signal that is transmitted by communication unit 120 via analog external interface 142. In some embodiments, ATE 150 may specify the amplitude and frequency of the generated input signal as needed for the desired test. For example, tone generator 620 may generate a sine wave having a particular frequency and amplitude. Alternatively, tone generator 620 may generate an input signal that includes noise generated by noise generator 650. In this manner, ATE 150 may analyze the transmitted signal at analog external interface 142 in order to test the transmitter portion of communication unit 120. In some embodiments, method 800 is also performed in parallel across a plurality of devices 102. For example, in one embodiment, ATE 150 supports multiple analog inputs, allowing multiple transmitters to be tested at a time.

The following list includes various tests that may be performed using method 800. Note that each example includes exemplary program instructions that may be executed by ATE 150. In other embodiments, each test may be performed differently as desired.

Single Tone Absolute Power
  Test mode/circuit:
    A tone generator 620 may be programmed via JTAG to drive a sinusoidal waveform into the transmit DAC.
  Test Overview:
    The transmit single tone test measures the overall power of the transmitter at the saturated region of operation. The ATE microwave capture instrument analyzes the signal being transmitted while the tone generator is driving the data. The power measurement is made on the upper side band signal and then two more relative measurements are made on the lower side band and carrier to determine what the amplitude and phase mismatches are on the I/Q. This test may only be performed for a lower channel in the band (the mid and upper channel may be done in loopback).

ATE program:
1) Setup radio (gain, channel, etc.) with JTAG pattern
2) Set ate_tonegen_tone1_enable bit
3) Set ate_tonegen_tone1_freq bits to drive 5 Mhz signal
4) Set appropriate ate_tonegen_tone1_backoff bits
5) Capture transmitted signal with ATE microwave instrument.
6) Determine USB measurement and relative carrier and LSB value.
7) Determine pass or fail result.

Phase Noise Measurement

Test mode/circuit:
A tone generator 620 may be programmed via JTAG to drive a sinusoidal waveform into the transmit DAC. The transmitted signal may be captured using the ATE microwave capture.

Test Overview:
The synthesizer is tested to determine how much phase noise is present. The device 100 transmits a signal on the carrier and the ATE microwave capture instrument measures power at the carrier and the relative power at different offsets from the carrier.

Figure 9:
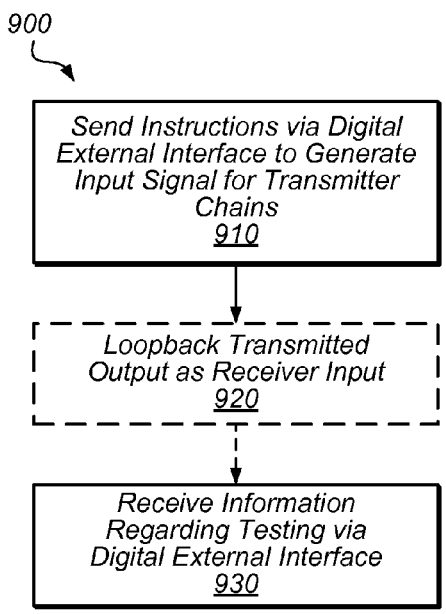
FIG. 9 is a flowchart illustrating an exemplary method for testing both the receiver and transmitter portions of a communication unit.

ATE program:
1) Setup radio (gain, channel, etc.) with JTAG pattern
2) Set appropriate ate_tonegen_dc_i/q bits (will generate a tone at carrier)
3) Set ate_tonegen_dc_enable bit
4) Capture transmitted signal with ATE microwave instrument
5) Determine carrier power and measure relative power of various frequencies offset from carrier
6) Determine pass or fail result Turning now to FIG. 9, an exemplary method 900 for testing both the receiver and transmitter portions is depicted. Method 900, in one embodiment, is performed by ATE 150. Corresponding methods performed by analog test unit 130 are also contemplated. In step 910, ATE 150 sends one or more instructions to analog test unit 130, via digital external interface 144, to generate an input signal for one or both transmitter paths 221. As noted above, ATE 150, in some embodiments, may specify various attributes for the input signal (e.g., amplitude and frequency). In step 920, ATE 150 loops back the transmitted output as the receiver input. For example, ATE 150, in one embodiment, receives a signal processed by transmitter chain 220 and provides it as an input to receiver chain 210. In another embodiment, ATE 150 may configured to physically couple the output of the transmitter portion of communication unit 120 to the input of the receiver portion of communication unit 120 (e.g., via analog external interface 142) such that a transmitted signal is provided as an input to the receiver portion. In some embodiments, step 920 may not be performed as indicated by the dotted line. For example, the output of transmitter chain 220 may already be coupled to the input of receiver chain 210 within unit 120, via a load board coupled to unit 120, etc. In any event, analog test unit 130 may be configured to analyze a receiver-processed version the transmitted signal and generate a corresponding set of testing results. In step 930, ATE 150 receives information regarding the testing results from analog test unit 130 via digital external interface 144. In one embodiment, ATE 150 receives this information by accessing register bank 306. In another embodiment, analog test unit 130 is configured to transmit this information over digital external interface 144 to ATE 150.

In some embodiments, ATE 150 performs method 900 to test multiple receiver chains 210 and transmitter chains 220 in parallel. For example, ATE 150 may perform method 900 to simultaneously test a plurality wireless LAN chains and a plurality cellular chains within a device 102. In various embodiments, ATE 150 may also perform method 900 to test a plurality of chains in different devices in parallel. For example, ATE 150 may perform method 900 to test the receiver chains 210 and transmitter chains 220 within devices 102A and 102B in parallel.

The following list includes various tests that may be performed using method 900. Note that each example includes exemplary program instructions that may be executed by ATE 150. In other embodiments, each test may be performed differently as desired.

Single Tone Loopback

Test mode/circuit:
The tone generator may be programmed via JTAG to drive a sinusoidal waveform into the transmit DAC. The resulting signal is externally looped back to the receiver where the down converted baseband signal is measured using the CMAC correlator feature.

Test Overview:
This test may be performed on a middle and upper channel in the band and measures the performance of both the transmitter and the receiver. The transmitter is checked for upper side band power, carrier leak, and lower side band suppression. The receiver is tested for amplitude balance and phase mismatch.

ATE program:
1) Set ate_tonegen_tone1_freq bits to drive 5 Mhz signal
2) Set appropriate ate_tonegen_tone1_backoff bits
3) Set ate_tonegen_tone1_enable bit
4) Set appropriate ate_cmac_corr_cycles bits
5) Set ate_cmac_corr_freq bits to read back bin at 5 Mhz (USB bin)
6) Set ate_cmac_corr_enable bit
7) Wait for ate_cmac_corr_done bit to be set (ate_cmac_corr_enable bit will be cleared automatically by device)
8) Read back ate_cmac_results_i/q results
9) Set ate_cmac_corr_freq bits to read back bin at 0 Mhz (carrier bin)
10) Set ate_cmac_corr_enable bit
11) Wait for ate_cmac_corr_done bit to be set
12) Read back ate_cmac_results_i/q results
13) Set ate_cmac_corr_freq bits to read back bin at −5 Mhz (LSB bin)
14) Set ate_cmac_corr_enable bit
15) Wait for ate_cmac_corr_done bit to be set
16) Read back ate_cmac_results_i/q bits with ATE digital capture
17) Determine pass or fail result Noise Figure Test mode/circuit:
A tone generator 620 and noise generator 640 drive a PRBS stream into the DACs (white noise generator). CMAC unit 320 measures and reads back the I^2+Q^2 values.

ATE program:
1) Turn off transmitter
2) Setup radio (gain, channel, etc.) with JTAG pattern
3) Set ate_cmac_dc_enable bit
4) Set ate_cmac_dc_write_to_cancel bit—the measured dc_value will be canceled for subsequent measurements until a reset is initiated (specific to a rx gain setting)
5) Wait for ate_cmac_dc_done bit to be set
6) Turn on transmitter to appropriate gain
7) Set appropriate ate_tonegen_prbs_magnitude bits
8) Set ate_tonegen_prbs_enable_i and q bits
9) Set appropriate ate_cmac_power_cycles bits
10) Set ate_cmac_power_enable bit 11) Wait for ate_cmac_power_done bit to be set
12) Read back ate_cmac_results_i and q bits
13) Determine pass or fail results Gain Step Test Test mode/circuit:
A tone generator 620 drives a signal that is looped back to the receiver and analyzed by the CMAC correlator feature.

Test Overview:
The different amplifiers in both the transmitter and receiver blocks are tested to make sure that they are operating properly. The transmitter and receiver gains are varied such that the resulting signal will not saturate each block. An absolute power measurement of the tone is made which is used as a reference to make the subsequent relative measurements as the different gains are exercised. All measurements may be done only on the USB tone.

ATE program:
1) Set ate_tonegen_tone1_freq bits to drive 5 Mhz signal
2) Set appropriate ate_tonegen_tone1_backoff bits
3) Set ate_tonegen_tone1_enable bit
4) Set appropriate ate_cmac_corr_cycles bits
5) Set ate_cmac_corr_freq bits to read back bin at 5 Mhz (USB bin)
6) Setup radio (gain) with JTAG pattern
7) Set ate_cmac_corr_enable bit
8) Wait for ate_cmac_corr_done bit to be set
9) Read back ate_cmac_results_i/q bits with ATE digital capture
10) Repeat steps 6-9 for each gain step and also make sure the rx and tx gains are varied to minimize range error of capture
11) Determine pass or fail result Two Tone Test Test mode/circuit:
Two tone generators 620 create a two tone signal that is looped back to the receiver and analyzed by CMAC unit 320. This test may also be done using the ATE microwave capture.

Test Overview:
The test measures the second order intermediation components of the transmitted and received paths. The linearity of each can then be interpreted based on the results.

ATE program:
1) Set ate_tonegen_tone0_enable and ate_tonegen_tone1_enable bits
2) Set ate_tonegen_tone0_freq to 3*1.25 Mhz
3) Set ate_tonegen_tone1_freq to 7*1.25 Mhz
4) Set appropriate ate_tonegen_tone0_backoff and ate_tonegen_tone1_backoff bits
5) Setup tx gain to high value and also the appropriate channel with JTAG pattern
6) Set ate_cmac_i2q2_enable bit so CMAC will measure power of I and Q
7) Set appropriate ate_cmac_corr_cycles bits
8) Set ate_cmac_corr_freq bits to 3 (tone 0 Bin)
9) Set ate_cmac_dc_enable bit
10) Wait for ate_cmac_dc_done bit to be set
11) Read back ate_cmac_results_i/q bits with ATE digital capture
12) Set ate_cmac_corr_freq bits to 7 (tone 1 Bin)
13) Set ate_cmac_dc_enable bit
14) Wait for ate_cmac_dc_done bit to be set
15) Read back ate_cmac_results_i/q bits with ATE digital capture
16) Set ate_cmac_corr_freq bits to 11 (2*tone 1-tone0)
17) Set ate_cmac_dc_enable bit
18) Wait for ate_cmac_dc_done bit to be set
19) Read back ate_cmac_results_i/q bits with ATE digital capture
20) Set ate_cmac_corr_freq bits to −1 (2*tone 0-tone1)
21) Set ate_cmac_dc_enable bit
22) Wait for ate_cmac_dc_done bit to be set
23) Read back ate_cmac_results_i/q bits with ATE digital capture
24) Determine pass or fail result Filter Test Test mode/circuit:
Two tone generators 620 create a two tone signal that is looped back to the receiver and analyzed by CMAC 320. This test may also be done using the ATE microwave capture.

Test Overview:
This test is similar to the two tone test but the main difference is that the second tone is out of band to make sure the transmit filter is exhibiting the correct characteristics. CMAC unit 320 measures the power of both tones and based on the attenuation of the second tone, the test will either pass or fail. The transmitter and receiver may share the same filters and therefore only one test may be needed.

ATE program:
1) Set ate_tonegen_tone0_freq to 7*1.25 Mhz
2) Set ate_tonegen_tone1_freq to 11*1.25 Mhz
3) Set appropriate ate_tonegen_tone0_backoff and ate_tonegen_tone1_backoff bits
4) Set ate_tonegen_tone0_enable and ate_tonegen_tone1_enable bits
5) Setup tx gain to high value and also the appropriate channel with JTAG pattern
6) Set appropriate ate_cmac_corr_cycles bits
7) Set ate_cmac_corr_freq bits to 7 (tone 0 Bin)
8) Set ate_cmac_dc_enable bit
9) Wait for ate_cmac_dc_done bit to be set
10) Read back ate_cmac_results_i/q bits with ATE digital capture
11) Set ate_cmac_corr_freq bits to 11 (tone 1 Bin)
12) Set ate_cmac_dc_enable bit
13) Wait for ate_cmac_dc_done bit to be set
14) Read back ate_cmac_results_i/q bits with ATE digital capture
15) Determine pass or fail result Carrier Leak Calibration Test Test mode/circuit:
This test uses the tone generator unit 330 to drive dc_values onto the DAC and the resulting waveforms are captured by CMAC unit 320.

Test Overview:
First the receiver dc_offset is canceled using Rx DC offset estimation unit 510. Next a series of dc_signals are transmitted with a tone generator 620 and measured with CMAC unit 320. Based on the measurements, the value needed to write back to the transmitter DAC is checked to make sure it is within an acceptable range. This value may not be written back unless deemed necessary.

ATE program:
1) Turn transmitter off
2) Setup radio to proper gain so that transmit gain, isolation gain, and rx gain put signal within ADC range
3) Set ate_cmac_dc_enable bit
4) Set ate_cmac_dc_write_to_cancel bit—the measured dc_value will be canceled for subsequent measurements until a reset is initiated (specific to a rx gain setting)

5) Wait for ate_cmac_dc_done bit to be set
6) Turn on transmitter to appropriate gain
7) Set ate_tonegen_dc_q to 0
8) Set ate_tonegen_dc_i to −256
9) Set ate_tonegen_dc_enable bit
10) Set appropriate ate_cmac_dc_cycles bits
11) Set ate_cmac_dc_enable bit
12) Wait for ate_cmac_dc_done to go high
13) Read back ate_cmac_results_i and q bits with ATE digital capture
14) Set ate_tonegen_dc_i to 256
15) Set ate_cmac_dc_enable bit
16) Wait for ate_cmac_dc_done to go high
17) Read back ate_cmac_results_i and q bits with ATE digital capture
18) Determine I transmit DAC offset
19) Set ate_tonegen_dc_i to 0
20) Set ate_tonegen_dc_q to −256
21) Set ate_cmac_dc_enable bit
22) Wait for ate_cmac_dc_done to go high
23) Read back ate_cmac_results_i and q bits with ATE digital capture
24) Set ate_tonegen_dc_q to 256
25) Set ate_cmac_dc_enable bit
26) Wait for ate_cmac_dc_done to go high
27) Read back ate_cmac_results_i and q bits with ATE digital capture
28) Determine Q transmit DAC offset
29) Determine pass and fail result and write back value to transmit DACs.

Figure 10:
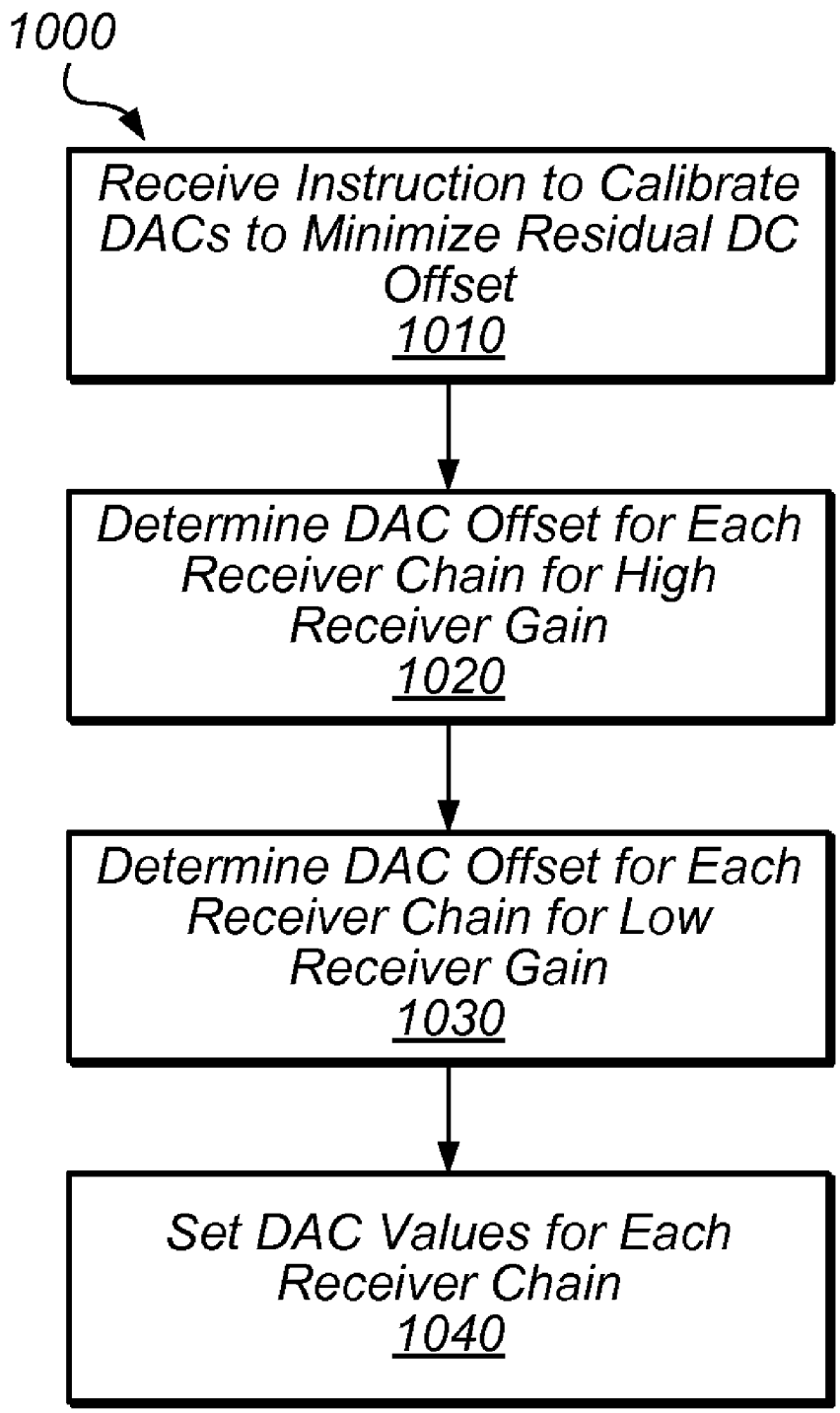
FIG. 10 is a flowchart illustrating an exemplary method for minimizing DC offsets of a communication unit.

Turning now to FIG. 10, a method 1000 for minimizing DC offsets of communication unit 120 is illustrated. As noted above, minimizing the DC offset can prevent a signal from becoming distorted as it is being converted from the analog to the digital domain. Method 1000, in one embodiment, is performed by analog test unit 130. A corresponding method may also be performed by ATE 150. In some embodiments, the DC offsets of multiple receiver chains 210 may be calibrated in parallel using method 1000. As described above, each DAC 212 is coupled to a respective amplifier unit in each path 211. In some embodiments, these amplifiers may operate using a plurality of different gain settings depending on the strength of the incoming signal. As a result, each path 211 may experience different DC offsets depending on the selected gain. Method 1000 may be useful in an embodiment in which different DAC offset values are calculated for each gain setting. For example, in one embodiment, DAC offset values may be calculated for a low gain and a high gain, while in another embodiment, DAC offset values may be calculated for each gain setting. In other embodiments, method 1000 may only calculate DAC offsets values for a single gain setting. Note that, in some embodiments, steps 1020 and 1030 may be performed in a different order than shown. In addition, step 1040 may be performed, in some embodiments, during (or in conjunction with) steps 1020 and 1030.

In step 1010, analog test unit 130 receives a set of one or more instructions from ATE 150 to calibrate DACs 212 in order to minimize the offsets of each receiver path 211. In one embodiment, the received set of instructions may be a generic set of instructions that is provided to multiple units 130 in different devices 102. In other embodiments, this set of instructions may be unique to a particular communication unit 120.

In step 1020, DC offset calibration unit 310 determines a DAC offset for each receiver path 211 by measuring the residual DC offset of each path 211 for a high receiver gain (i.e., the amplifiers coupled to DACs 212 are operating using a high gain). In one embodiment, unit 310 may measure the residual DC offset from an analog form of the incoming signal (e.g., at the input of each ADC 214). In another embodiment, unit 310 may measure the offset from a digital form of the incoming signal.

In one embodiment, DC offset calibration unit 310 measures the residual offset by applying different DAC offsets for a given path 211 until the offset of the path 211 is appropriately minimized. In one embodiment, unit 310 may test different DAC offset values in a linear manner in which unit 310 initializes offset DACs 212 to their most negative states and steps up their values until the sign bits of ADCs 214 change (indicating that the incoming signal is centered). On the other hand, unit 310 may test different offsets using a binary search method. For example, if unit 310 can apply the values 1, 2, and 3 to a given DAC 212, unit 310 applies the middle value 2 before applying the values 1 and 3. Unit 310 then determines whether to apply the values 1 or 3 based on whether the next applied value needs to be greater than 2 (i.e., 3) or less than 2 (i.e., 1).

In step 1030, DC offset calibration unit 310 determines a DAC value for each receiver path 211 by measuring the residual DC offset of each path 211 for a low receiver gain setting. Step 1030 may be performed in a similar manner as step 1020

In step 1040, DC offset calibration unit 310 sets the DAC values for each receiver path 211. In one embodiment, unit 310 receives an indication of the gain setting being used by the amplifiers from ATE 150, so that unit 310 can select appropriate DAC values. In other embodiments, modem 230 may provide this gain setting indication. In some embodiments, unit 310 may also store the determined DAC offsets in register bank 306. In various embodiments, ATE 150 may further analyze the DAC offsets and/or the measured DC offsets to determine if a given path 211 is faulty.

As noted above, automatically and locally calibrating the DC offsets of receiver chain 210 via unit 310 (in a manner such as described in method 1000) may significantly reduce the calibration time relative to prior solutions that serially calibrated DC offsets of devices using an analog interface of an ATE.

The following list includes a set of instructions from an exemplary program that may be executed by ATE 150 to perform method 1000. In other embodiments, method 1000 may be performed differently as desired.

Figures 11A, 11B:
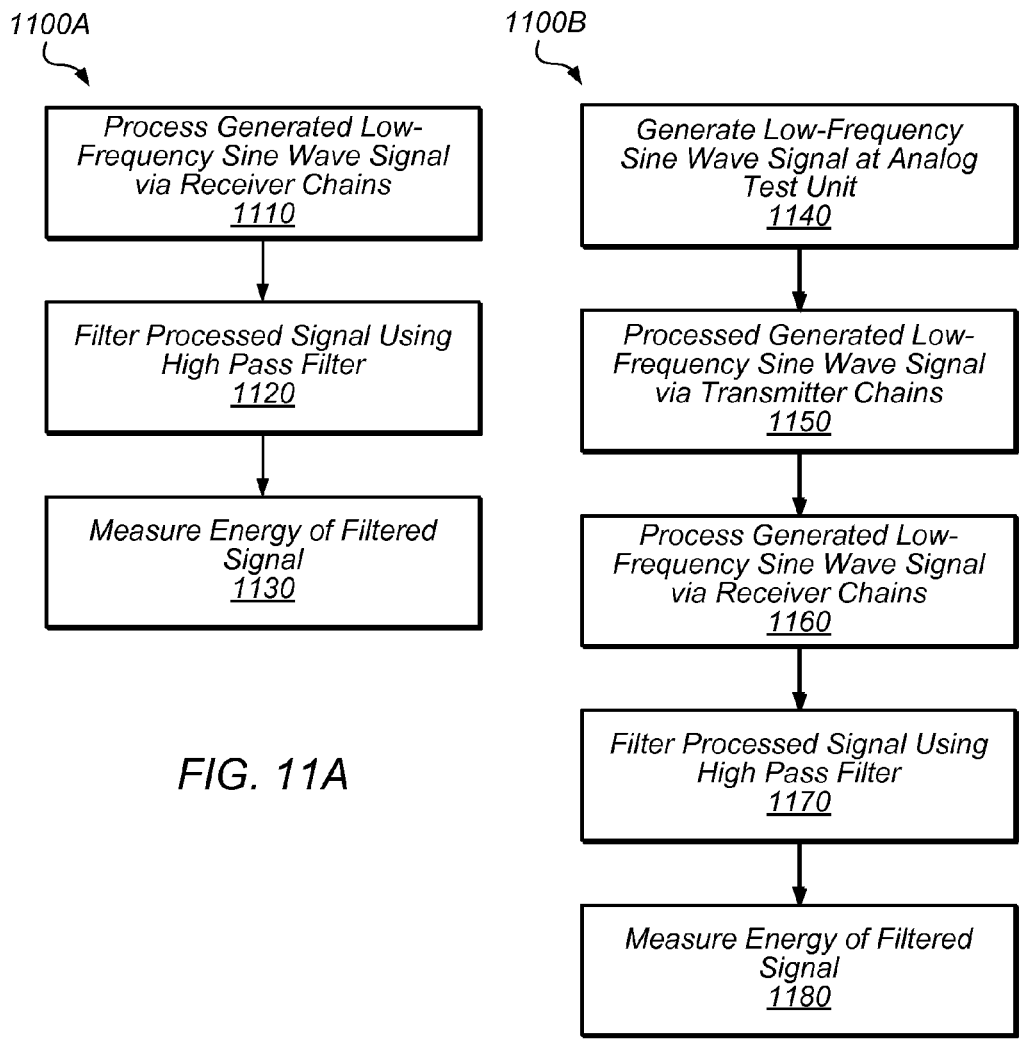
FIG. 11A illustrates an exemplary method for measuring nonlinearity of ADCs in a communication unit.
FIG. 11B illustrates an exemplary method for measuring nonlinearity of DACs and ADCs in a communication unit.

Offset Calibration
  Test mode/circuit:
    Analog test unit 130 uses DC offset calibration unit 310 to determine the values needed in DAC 212 to cancel any offsets present in chain 210. Below, the calibration is initiated and the resulting offsets are read back.
  Test Overview:
    Analog test unit 130 automatically determines what values need to be applied on the receive offset DAC in order to cancel the dc_offsets that are present on the block. The calibration is done for both a high gain and low gain setting. After initiating the calibration, the resulting values are read back to determine a pass of fail result and the calibration values will automatically be applied.
  ATE program:
  1) Set rx gain to high value
  2) Set ate_rxdac_mux bits to 2
  3) Set appropriate ate_rxdac_cal_wait bits
  4) Set ate_rxdac_hi_gain bit to 1
  5) Set ate_rxdac_calibrate bit
  6) Wait for ate_rxdac_done bit to be set
  7) Read back ate_rx_dac_i_hi/q_hi bits 8) Set rx gain to low value
9) Set ate_rxdac_hi_gain bit to 0
10) Set ate_rxdac_calibrate bit
11) Wait for ate_rxdac_done bit to be set
12) Read back ate_rx_dac_i_low/q_low bits
13) All subsequent tests that use ate_rxdac_mux bit of 3 will use calibrated result
14) Determine pass or fail result FIGS. 11A and 11B illustrate two methods 1100A and 1100B for measuring the nonlinearity of ADCs 214 and DACs 216 in communication unit 120.

In general, DACs may be composed of a bank of current sources such that the linearity of a DAC depends on the matching of the current sources. Essentially, the weights of the current sources can be modeled as random variables, rather than deterministic values. This is a very subtle nonlinearity and is difficult to measure. Other nonlinearities, such as stuck or coupled control lines, or compression due to current limitations are more apparent and may be caught using standard non-linearity measurement tests, such as total harmonic distortion (THD), or inter-modulation (IM) measurements.

That is, the main nonlinearities, like compression in amplifiers or in DACs due to stuck control lines are relatively easy to see with IM testing that is done with 2-tone tests, since various harmonic products can be identified by inputting 2 tones and looking at other tones. For example, if tones at f1 and f2 are used, $3^{rd}$ order products can be seen at frequencies 2f2-f1 and 2f1-f2. $5^{th}$ order, $7^{th}$ order, etc. can be seen at other frequencies. On the other hand, INL and DNL tests that are sensitive to just a couple LSBs of nonlinearity are more subtle and are more difficult to identify by measuring a couple of IM products. Prior solutions typically create many harmonics to a very high order polynomial. Embodiments described below, however, may measure the THD in the time domain by comparing the size of the fundamental to the size of the ADC output after removing the fundamental. In other words, all nonlinearity of a DAC/ADC (including stuck lines) can be expressed as the sum of a many-order polynomial in the time domain. In some embodiments, expressing nonlinearity in this manner is faster and better than prior solutions, especially since amplifiers may be dominated by just a few low-order terms.

ADCs (such as a successive approximate (SAR) ADC) are designed differently than DACs but the imperfections have similar effects. The ADC may be based on a bank of capacitors that transfers charges from one capacitor to another. The bits are deduced depending on the direction of charge transfer. The distortion of an ADC depends on the capacitance matching, which can also be modeled as random variables.

Nonlinearity of ADCs and DACs may be expressed as integral nonlinearity (INL) or differential nonlinearity (DNL). As noted above, DNL may refer to the deviation between two adjacent DAC (or ADC) output levels. For example, each level of a 10 bit DAC may correspond to 1 mV where the DAC supports a range of 0 mV-1023 mV. If the value 10 is represented by 10 mV but the value 11 is represented by 12 mV (instead of 11 mV), a 1 LSB DNL is said to be present. INL may refer to the maximum deviation between the ideal output of a DAC (or ADC) and the actual output level. For example, if the above DAC continues to represent each subsequent value after 11 with a 1 bit offset (i.e., the value 12 is represented by 13 mV, the value 13 is represented by 14 mV and so on), a 1 LSB INL is said to be present. Both terms may be used as a metric for measuring error in a DAC or an ADC.

Turning now to FIG. 11A, a method 1100A for measuring nonlinearity in ADCs 214 is shown. Method 1100A, in one embodiment, is performed by communication unit 120 in response to receiving one or more instructions from ATE 150.

In previous solutions, INL and DNL were measured by generating a value for each ADC/DAC level and then measuring the delta (i.e., change between each level). For example, a test would initially apply 0 mV to an ADC and increase the voltage in 1 mV steps measuring the delta of each step until reaching the upper boundary of 1023 mV. The test would then measure the delta as it decreased the voltage in 1 mV steps until reaching the lower boundary of 0 mv. Thus, the test would measure the delta for a total of 2048 generated values. As will be described below, the nonlinearity (e.g., the INL/DNL) of a DAC or ADC can introduce high frequency distortion into a signal that harms the error vector magnitude of the constellation and the corresponding spectrum. As a result, method 1110A (and method 1100B described below), in one embodiment, quantifies the amount of INL/DNL by isolating the high frequency distortion and measuring the strength of the distortion. In some embodiments, measuring the high frequency distortion is significantly faster than measuring the delta between each DAC/ADC level.

In step 1110, receiver chain 210 processes a generated low-frequency sine wave signal that steps through each level of ADCs 214. In other words, the sine wave includes a voltage for each level supported by ADCs 214 such that ADCs 214 generate a corresponding value for each level. For example, in some embodiments, the sine wave may change by 1 mV increments so that the entire 0 mV to 1023 mV range is tested. In various embodiments, this signal is generated by ATE 150 and provided via analog external interface 142. In one embodiment, the low-frequency tone is a full-scale tone with a frequency of 25 kHz higher than the LO frequency of communication unit 120. The analog RF and baseband gain settings may also be set to a very linear group of settings so that the ADC would be the dominant nonlinearity source. In other embodiments, this signal is a 50 kHz tone with reduced amplitude. In still other embodiments, I and/or Q baseband sine waves at 25 kHz may be sent via an analog test bus directly to the ADCs 214. In some embodiments, the signal is generated based on the following inequality (note: the signal amplitude A is reduced to allow higher frequencies):

2*pi*f/fs*A<1, A=2^9, fs=80e6

25 kHz<=f<fc, where fc is the edge of the stop-band.

As ADCs 214 digitize the signal, the presences of nonlinearity may introduce high frequency noise into the processed low-frequency signal.

In step 1120, the processed signal is filtered using a high pass filter (such as HPF 562) to remove low frequencies (e.g., such as quantization noise) but isolate high frequencies (such as the introduced distortion). In one embodiment, the high pass filter has the following properties: fc=100 kHz, fp=1.3 MHz, Ac=−80 dB, Ap_ripple=0.5 dB.

In step 1130, analog test unit 130 measures the energy of the filtered signal (e.g., in the form of a signal-to-noise and distortion ratio (SNDR)) in order to identify the nonlinearity. In one embodiment, analog test unit 130 determines the SNDR by measuring the power (e.g., for 2^13 samples) of a quadrature channel at a given ADC 214 (e.g., using $I^2$ and $Q^2$ calculation unit 540) and measuring the power of the filtered signal (e.g., using high frequency power calculation unit 564). Then, ATE 150 may compute the SNR according to the formula 10*log 10 (power at ADC/power of filtered signal). In one embodiment, the signal-to-noise ratio for an ideal ADC may be 10*log 10(2^18/2/(1/12))=62 dB. The SNDR may degrade to approximately 53 dB if an ADC has an INL of at least 4 least significant bits (LSB). In some embodiments, an INL of 4 LSB may be the maximum permitted tolerance for an ADC. As a result, if an SNDR degrades below 53 dB, the ADC may not be functioning properly.

FIG. 11B illustrates a method 1110B for measuring the nonlinearity of DACs and ADCs in communication unit 120. Method 1100B, in one embodiment, is performed by communication unit 120 in response to receiving one or more instructions from ATE 150.

Typically, a DAC and an ADC are two distinct devices with imperfections that are statistically independent. Therefore, the power levels of the distortions induced by the respective nonlinearities are additive when a signal is processed by a DAC and then by an ADC. In other words, if a value a digital signal is converted to an analog signal by a DAC with an INL of 1 LSB and distortion power of Pd DAC, and the resulting analog signal is converted back to a digital value by an ADC with an INL of 2 LSB and distortion power of Pd ADC, the resulting digital value may have a total distortion of Pd total = Pd DAC+Pd ADC, and 2<=INL total<=3.

As described below, a generated signal is processed, in method 1100B, by DACs 216 and ADCs 214. If any DAC or ADC has nonlinearity, the result will be present in the processed signal in the form of a high frequency distortion.

Turning now to FIG. 11B, low-frequency tone generator 630, in step 1140 generates a low-frequency signal that steps through each level of DACs 216 (i.e., the sine wave includes a value for each level supported by DACs 216 such that DACs 216 generate a corresponding voltage for each level). For example, the sine wave may be slow enough that the maximum step is 1 bit, so that DACs 216 generate a voltage for each value in the 0-1023 range. In some embodiments, the generated signal is similar to the signal described in step 1110. In step 1150, transmitter chain 220 processes the generated low-frequency signal using DACs 216. In step 1160, receiver chain 210 further processes the generated signal such as described in step 1110. In one embodiment, this generated signal is looped back at RF through both transmitter chain 220 and receiver chain 210. In other embodiments, the generated signal is looped back directly at baseband via a dedicated analog line bringing the DAC output to the ADC inputs. In step 1170, the processed signal is filtered using a high pass filter such as described in step 1120. In step 1180, analog test unit 130 measures the energy of the filtered signal. In one embodiment, the energy is measured as the SNR of the filtered signal such as described above in 1130.

As previously noted, the SNR may indicate the presence of nonlinearity (e.g., in the form of INL/DNL) in ADCs 214 and DACs 216. If significant INL/DNL is present, one or more of the ADCs or DACs may not be performing within permitted design tolerance. It is noted that method 1110B may only identify the effects of nonlinearity and not whether a particular ADC or DAC is responsible for introducing distortion.

As a result, communication unit 120, in some embodiments, may perform method 1100A first in order to ensure ADCs 214 are functioning correctly prior to performing method 1100B. In other words, if one or more of the ADCs 214 is malfunctioning, a low SNR (measured in method 1100A) will indicate that an ADC 214 has nonlinearity. If the ADCs 214 are functioning correctly (e.g., a sufficient SNR is measured in method 1100A), a low SNR (measured in method 1100B) may indicate that one or more of DAC 216 have nonlinearity. In other words, by knowing the signal to distortion-plus-noise ratio (SNDR) of an ADC 214, and comparing it to the loopback SNDR, it is possible to compute the DAC distortion levels because any degradation is due to the DAC INL/DNL.

As noted above, prior solutions measure the nonlinearity in a DAC/ADC by measuring the delta between each level of the DAC/ADC. Thus, an ATE might calculate 2048 values when testing only a single 10 bit DAC (and calculate 2×2048 values for a pair of 10 bit DACs). Furthermore, the ATE uses an analog interface to generate the signal that tests each DAC/ADC, so the ATE must test each device serially. Methods 1100A and 1100B, in some embodiments, are significantly faster than prior solutions because only a single overall measurement (i.e., the measurements in steps 1130 and 1180) need be performed. In addition, methods 1100A and 1100B may test multiple DACs/ADCs in different transmitter/receiver chains in parallel. Moreover, methods 1100A and/or 1100B may also be performed on multiple devices 102 in parallel. Therefore, testing four devices each having 2 DACs and 2 ADCs in parallel may, in some embodiments, reduce testing time by 1/16.

Various embodiments for testing an analog portion of a communication unit described herein may include storing instructions and/or data implemented in accordance with the foregoing description in an article of manufacture such as a tangible computer-readable memory medium, including various portions of memory in device 102, communication unit 120, analog test unit 130, and ATE 150. Certain embodiments of these tangible computer-readable memory media may store instructions that are computer executable to perform actions in accordance with the present disclosure. Generally speaking, such an article of manufacture may include storage media or memory media such as magnetic (e.g., disk) or optical media (e.g., CD, DVD, and related technologies, etc.). The article of manufacture may be either volatile or nonvolatile memory. For example, the article of manufacture may be (without limitation) SDRAM, DDR SDRAM, RDRAM, SRAM, flash memory, and of various types of ROM, etc. ATE 150 shown in FIGS. 1A and 1B, for example, may include tangible computer-readable media having program instructions stored therein that are executable for instructing analog test unit 130 and receiving information from analog test unit 130. Analog test unit 130, for example, may include tangible computer-readable media having program instructions therein that are executable for testing the analog portion of communication unit 130 and communicating information regarding testing to ATE 150. In general, various ones of the methods described herein may be implemented using program instructions that are stored on various forms of tangible computer-readable media.

Further embodiments of programs described herein may include storing/encoding instructions and/or data on signals such as electrical, electromagnetic, or optical signals, conveyed via a communication medium, link, and/or system (e.g., cable, network, etc.), whether wired, wireless or both. Such signals may carry instructions and/or data implemented in accordance with the foregoing description.

Various embodiments described above refer to a system 100 for testing devices 102. Although these devices 102 have been described within the context of wireless communication, embodiments of the present disclosure may also be applicable to wired communication devices. For example, in one particular embodiment, system 100 may be employed to test network devices that communicate via Ethernet or other non-wireless communication protocols. Accordingly, embodiments of the present disclosure are not solely applicable to wireless devices but rather any devices with analog circuitry that may include amplifiers, ADCs, DACs, etc.

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a device on a single integrated circuit, wherein the device includes:
        an analog external interface;
        a digital external interface;
        a communication unit configured to perform communication via the analog external interface, wherein the communication unit has a transmitter portion and a receiver portion; and
        an analog test unit including a tone generator unit, wherein the analog test unit is configured to test the transmitter and receiver portions of the communication unit by:
            generating, with the tone generator unit, a test signal that is output by the transmitter portion and looped back to the receiver portion, wherein the generated test signal has an amplitude and a frequency that are specified by an external test unit; and
            subsequently receiving the looped back test signal from the receiver portion;
        wherein the analog test unit is configured to perform an analysis of the received looped back test signal and to communicate information regarding the analysis to the external test unit via the digital external interface.

2. The apparatus of claim 1, wherein the transmitter portion includes a plurality of transmitter chains, and wherein the receiver portion includes a plurality of receiver chains, and wherein the analog test unit is configured to test at least two of the plurality of transmitter chains in parallel, and wherein the analog test unit is configured to test at least two of the plurality of receiver chains in parallel.

3. The apparatus of claim 1, wherein the analog test unit includes a unit that is configured to:
    correlate the received looped back test signal with a complex sinusoid; and
    measure the power of the correlated signal.

4. The apparatus of claim 1, wherein the analog test unit includes a complex multiply accumulate (CMAC) unit that is configured to measure the power of an I and/or Q quadrature channel of the received looped back test signal.

5. The apparatus of claim 1, wherein the analog test unit is further configured to identify nonlinearity of a digital to analog converter (DAC) in the transmitter portion, and wherein the analog test unit is further configured to identify nonlinearity of an analog to digital converter (ADC) in the receiver portion.

6. The apparatus of claim 1, wherein the analog test unit is further configured to perform analysis on a second test signal generated by the external test unit and received by the receiver portion; and
    communicate information regarding the analysis of the second test signal to the external test unit via the digital external interface.

7. The apparatus of claim 1, wherein the analog test unit is further configured to generate a second test signal and transmit the second test signal to the external test unit through the transmitter portion and the analog external interface.

8. The apparatus of claim 1, further comprising the external test unit, wherein the external test unit includes a load board that includes circuitry that is configured to loop back the test signal that is output by the transmitter portion to the receiver portion.

9. A method, comprising:
    a test device sending, in parallel, a common set of one or more instructions to each of a plurality of integrated circuits under test by the test device, wherein each of the plurality of integrated circuits includes a communication unit that has an analog portion, and wherein each of the plurality of integrated circuits further includes an analog test unit, wherein sending the common set of instructions to each of the plurality of integrated circuits causes the analog test unit in each of the integrated circuits to:
        test the analog portion of its respective communication unit, by generating a respective test signal with a tone generator unit included in that analog test unit, wherein the common set of instructions specifies an amplitude and a frequency of the generated test signals;
        store corresponding test results in a memory of the integrated circuit;
    the test device receiving, in parallel, the corresponding test results from each of the plurality of integrated circuits, wherein the corresponding test results are received via a digital interface of each of the plurality of integrated circuits.

* * * * *